US012695896B2

(12) United States Patent
Yang

(10) Patent No.: US 12,695,896 B2
(45) Date of Patent: Jul. 28, 2026

(54) DEVICE AND METHOD FOR CODING VIDEO DATA

(71) Applicant: SHARP KABUSHIKI KAISHA, Sakai (JP)

(72) Inventor: Yu-Chiao Yang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/718,985

(22) PCT Filed: Dec. 15, 2022

(86) PCT No.: PCT/CN2022/139281
§ 371 (c)(1),
(2) Date: Jun. 12, 2024

(87) PCT Pub. No.: WO2023/109899
PCT Pub. Date: Jun. 22, 2023

(65) Prior Publication Data
US 2025/0133227 A1    Apr. 24, 2025

Related U.S. Application Data

(60) Provisional application No. 63/265,777, filed on Dec. 20, 2021, provisional application No. 63/265,442, filed on Dec. 15, 2021.

(51) Int. Cl.
*H04N 19/44* (2014.01)
*H04N 19/105* (2014.01)
*H04N 19/176* (2014.01)

(52) U.S. Cl.
CPC ........... *H04N 19/44* (2014.11); *H04N 19/105* (2014.11); *H04N 19/176* (2014.11)

(58) Field of Classification Search
CPC ............................ H04N 19/44; H04N 19/105
See application file for complete search history.

(56) References Cited

U.S. PATENT DOCUMENTS

| | | | |
|---|---|---|---|
| 2018/0255316 A1* | 9/2018 | Zhang | H04N 19/503 |
| 2018/0359483 A1 | 12/2018 | Chen et al. | |

(Continued)

FOREIGN PATENT DOCUMENTS

| | | |
|---|---|---|
| CN | 113452870 A | 9/2021 |
| JP | 2020523853 A | 8/2020 |

(Continued)

OTHER PUBLICATIONS

Series H: Audiovisual and Multimedia Systems, Infrastructure of audiovisual services—Coding of moving video, High efficiency video coding, ITU-T H.265 (Aug. 2021).

(Continued)

*Primary Examiner* — Irfan Habib
(74) *Attorney, Agent, or Firm* — ScienBiziP, P.C.

(57)    ABSTRACT

A method of decoding video data by an electronic device is provided. The method receives the video data and determines a block unit from an image frame according to the video data. In addition, the method determines a plurality of candidate positions including at least one non-adjacent position which is non-adjacent to the block unit, and determine a plurality of motion candidates from the candidate positions. The method further selects, based on the motion candidates, a plurality of collocated blocks each included in one of one or more collocated frames included in the video data, and determine a plurality of first cost values, each corresponding to one of the collocated blocks. Then, the method determines at least one subblock-based temporal motion vector prediction (SbTMVP) candidate based on the (Continued)

Start ␣~800
Receive video data ␣~810
Determine a block unit from an image frame according to the video data ␣~820
Determine multiple candidate positions selected from multiple adjacent positions adjacent to the block unit and multiple non-adjacent positions non-adjacent to the block unit ␣~830
Determine multiple motion candidates from the multiple candidate positions ␣~840
Determine, based on the multiple motion candidates, multiple collocated blocks each included in one of one or more collocated frames ␣~850
Derive multiple subblock-based temporal motion vector prediction (SbTMVP) candidates based on motion information of the multiple collocated blocks ␣~860
Determine a plurality of first cost values, each corresponding to one of the multiple SbTMVP candidates ␣~870
Determine an arrangement for the multiple SbTMVP candidates based on the first cost values and generate an adjusted SbTMVP list based on the arrangement ␣~880
Reconstruct the block unit based on the SbTMVP list ␣~890
End motion candidates and the first cost values and reconstructs the block unit based on the at least one SbTMVP candidate.

18 Claims, 10 Drawing Sheets

(56) References Cited

U.S. PATENT DOCUMENTS

| | | | | |
|---|---|---|---|---|
| 2020/0186825 | A1* | 6/2020 | Rusanovskyy | H04N 19/105 |
| 2020/0195948 | A1* | 6/2020 | Li | H04N 19/176 |
| 2020/0228828 | A1* | 7/2020 | Li | H04N 19/577 |
| 2020/0260095 | A1* | 8/2020 | Li | H04N 19/44 |
| 2021/0051329 | A1 | 2/2021 | Ko et al. | |
| 2021/0136363 | A1 | 5/2021 | Jang | |
| 2021/0160531 | A1* | 5/2021 | Zhang | H04N 19/17 |
| 2021/0235111 | A1* | 7/2021 | Fishwick | H04N 19/573 |
| 2021/0243476 | A1* | 8/2021 | Ko | H04N 19/463 |
| 2022/0239899 | A1* | 7/2022 | Zhang | H04N 19/46 |
| 2023/0117308 | A1* | 4/2023 | Huang | H04N 19/14 375/240.02 |
| 2023/0247216 | A1* | 8/2023 | Huang | H04N 19/513 375/240.15 |
| 2023/0388485 | A1* | 11/2023 | Gao | H04N 19/52 |
| 2024/0015319 | A1* | 1/2024 | Chen | H04N 19/172 |
| 2024/0155111 | A1* | 5/2024 | Zhang | H04N 19/119 |
| 2025/0008115 | A1 | 1/2025 | Jang et al. | |

FOREIGN PATENT DOCUMENTS

| | | | |
|---|---|---|---|
| JP | 2020145486 | A | 9/2020 |
| JP | 2021516502 | A | 7/2021 |
| KR | 20210014197 | A | 2/2021 |

OTHER PUBLICATIONS

Benjamin Bross et al.: "Versatile Video Coding Editorial Refinements on Draft 10", JVET-T2001-v2, Joint Video Experts Team (JVET) of ITU-T SG 16 WP 3 and ISO/IEC JTC 1/SC 29, 20th Meeting, by teleconference, Oct. 7-16, 2020.

Series H: Audiovisual and Multimedia Systems, Infrastructure of audiovisual services—Coding of moving video, ITU-T H.266 (Aug. 2020).

Muhammed Coban et al.: "Algorithm description of Enhanced Compression Model 2 (ECM 2)", JVET-W2025, Joint Video Experts Team (JVET) of ITU-T SG 16 WP 3 and ISO/IEC JTC 1/SC 29, 23rd Meeting, by teleconference, Jul. 7-16, 2021.

Adrian Browne et al. : "Algorithm description for Versatile Video Coding and Test Model 14 (VTM 14)", JVET-W2002-v1, Joint Video Experts Team (JVET) of ITU-T SG 16 WP 3 and ISO/IEC JTC 1/SC 29, 23rd Meeting, by teleconference, Jul. 7-16, 2021.

Jianle Chen et al.: "Algorithm description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020.

Benjamin Bross et al.: "Versatile Video Coding (Draft 10)", JVET-S2001-vG, Joint Video Experts Team (JVET) of ITU-T SG 16 WP 3 and ISO/IEC JTC 1/SC 29/WG 11, 19th Meeting: by teleconference, Jun. 22-Jul. 1, 2020.

Na Zhang et al.: "EE2-3.1/EE2-3.2: Adaptive Reordering of Merge Candidates with Template/Bilateral Matching", JVET-W0090-v2, Joint Video Experts Team (JVET) of ITU-T SG 16 WP 3 and ISO/IEC JTC 1/SC 29, 23rd Meeting, by Teleconference, Jul. 7-16, 2021.

Yao-Jen Chang et al.:"EE2-related: MV candidate type-based ARMC", JVET-X0133-v1, Joint Video Experts Team (JVET) of ITU-T SG 16 WP 3 and 1S0/IEC JTC 1/SC 29, 24th Meeting, by teleconference, Oct. 6-15, 2021.

Lei Zhao et al.: "Non-EE2: Template Matching Based Merge Candidate List Construction (TM·MCLC)", JVET-X0087-v1, Joint Video Experts Team (JVET) of ITU-T SG 16 WP 3 and ISO/IEC JTC 1/SC 29, 24th Meeting, by teleconference, Oct. 6-15, 2021.

Ru-Ling Liao et al.:"AHG12: Additional SbTMVP candidates", JVET-AF0135-v1, Joint Video Experts Team (JVET) of ITU-T SG 16 WP 3 and ISO/IEC JTC 1/SC 29, 32nd Meeting, Hannover, DE, Oct. 13-20, 2023.

* cited by examiner

9000

900

DEVICE AND METHOD FOR CODING VIDEO DATA

CROSS-REFERENCE TO RELATED APPLICATION(S)

This application is a National Stage application of International Patent Application Serial No. PCT/CN2022/139281, filed on Dec. 15, 2022, which claims the benefit of and priority to U.S. Provisional Patent Application Ser. No. 63/265,442, filed on December 15, 2021 and U.S. Provisional Patent Application Ser. No. 63/265,777, filed on Dec. 20, 2021, the contents of all of which are hereby incorporated herein fully by reference in their entirety for all purposes.

FIELD

The present disclosure generally relates to video coding, and more specifically, to techniques for predicting a block unit based on multiple reference blocks.

BACKGROUND

Subblock-based temporal motion vector prediction (SbTMVP) is a coding tool for video coding. In a conventional video coding method, an encoder and a decoder may determine a collocated block in a collocated frame for a target block in an image frame to generate one of multiple SbTMVP candidates for predicting the target block.

The encoder and decoder may divide the collocated block into multiple collocated subblocks, and use the motion information of the collocated block to determine multiple first subblock vectors Vs1 for the collocated subblocks in the collocated block. Then, the encoder and decoder may divide the target block into multiple target subblocks, and derive multiple second subblock vectors Vs2 for the target subblocks in the block unit based on the first subblock vectors Vs1 of the collocated subblocks. Each of the second subblock vectors Vs2 may be derived based on a corresponding one of the first subblock vectors Vs1, a reference distance between the image frame and a reference frame of the block unit, and a collocated distance between the collocated frame and a collocated reference frame of the collocated block.

However, the SbTMVP candidates for the target block is arranged only based on a collection order, so the coding efficiency for signaling an index to determine the selected SbTMVP candidate may not be high enough when the SbTMVP candidates are used to predict the target block. Therefore, the encoder and the decoder may need a new SbTMVP for predicting or reconstructing the target block more precisely.

SUMMARY

The present disclosure is directed to a device and method for predicting a block unit in an image frame by using template predictions.

In a first aspect of the present disclosure, a method of decoding video data and an electronic device for performing the method are provided. The method includes receiving the video data; determining a block unit from an image frame according to the video data; determining multiple candidate positions including at least one non-adjacent position which is non-adjacent to the block unit; determining multiple motion candidates from the multiple candidate positions; selecting, based on the multiple motion candidates, multiple collocated blocks each included in one of one or more collocated frames included in the video data; determining multiple first cost values, each corresponding to one of the multiple collocated blocks; determining at least one sub-block-based temporal motion vector prediction (SbTMVP) candidate based on the multiple motion candidates and the multiple first cost values; and reconstructing the block unit based on the at least one SbTMVP candidate.

In another implementation of the first aspect, the multiple candidate positions further include at least one of multiple adjacent positions adjacent to the block unit.

An implementation of the first aspect further includes determining, from the image frame, multiple neighboring blocks neighboring the block unit based on the multiple candidate positions, wherein at least one of the multiple neighboring blocks covers one of the at least one non-adjacent position; determining, from the image frame, a template region adjacent to the block unit and multiple neighboring regions each adjacent to one of the multiple neighboring blocks; determining multiple second cost values, each corresponding to the template region and one of the multiple neighboring regions; selecting multiple candidate blocks based on the multiple second cost values; and determining the multiple motion candidates from the multiple candidate blocks.

In another implementation of the first aspect, each of the multiple motion candidates indicates a motion vector, list information, and frame information of a candidate block covering one of the multiple candidate positions, and a reference frame of a specific candidate block in the multiple candidate blocks selected from a reference list indicated by the list information of the specific candidate block is included in the one or more collocated frames when a frame index in the frame information of the specific candidate block is equal to one of at least one predefined value.

In another implementation of the first aspect, one of the multiple collocated blocks is selected from the reference frame of the specific candidate block based on the motion vector and a corresponding one of the multiple candidate positions.

In another implementation of the first aspect, the reference frame of the specific candidate block is excluded from the one or more collocated frames when the frame index in the frame information of the specific candidate block is different from the at least one predefined value.

In another implementation of the first aspect, each of the multiple motion candidates indicates a motion vector, list information, and frame information of a candidate block covering one of the multiple candidate positions, at least one reference frame of a specific candidate block in the multiple candidate blocks is determined from two reference lists of the specific candidate block when the specific candidate block is a bi-prediction block, and the at least one reference frame is included in the one or more collocated frames when one of two frame indices in the frame information of the specific candidate block is equal to one of at least one predefined value.

In another implementation of the first aspect, reconstructing the block unit based on the at least one SbTMVP candidate includes: adding the at least one SbTMVP candidate into a candidate list; selecting a prediction candidate from the candidate list based on a prediction index; and reconstructing the block unit based on the selected prediction candidate.

In another implementation of the first aspect, the multiple collocated blocks is selected from more than one collocated frame.

An implementation of the first aspect further includes determining, from the image frame, a template region adjacent to the block unit and determining, from the one or more collocated frames, multiple collocated regions each adjacent to one of the multiple collocated blocks; and determining the multiple first cost values between the template region and each of the multiple collocated regions.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
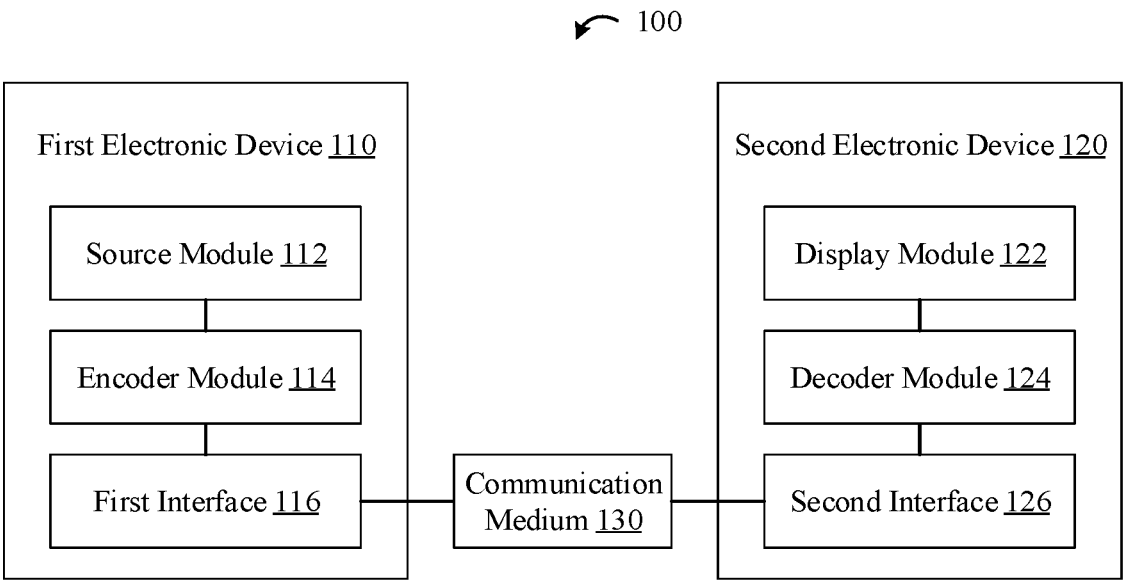
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
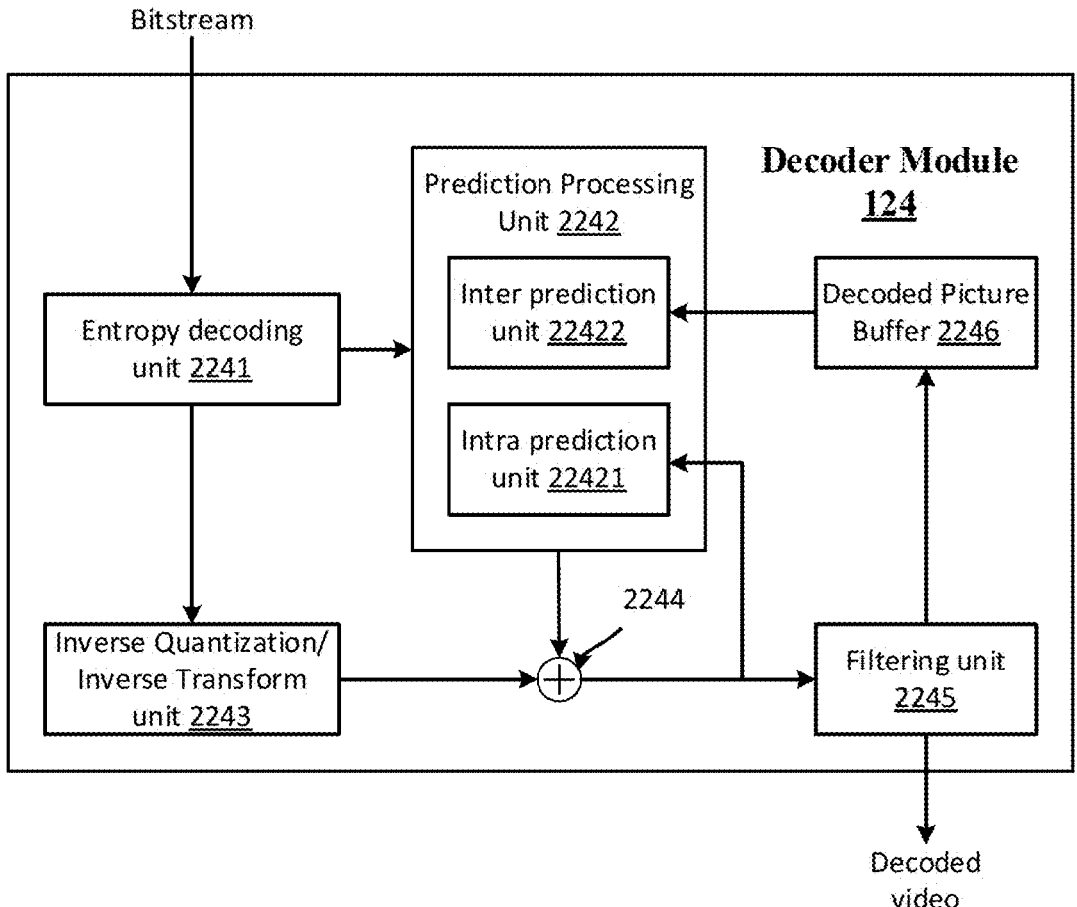
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/ inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
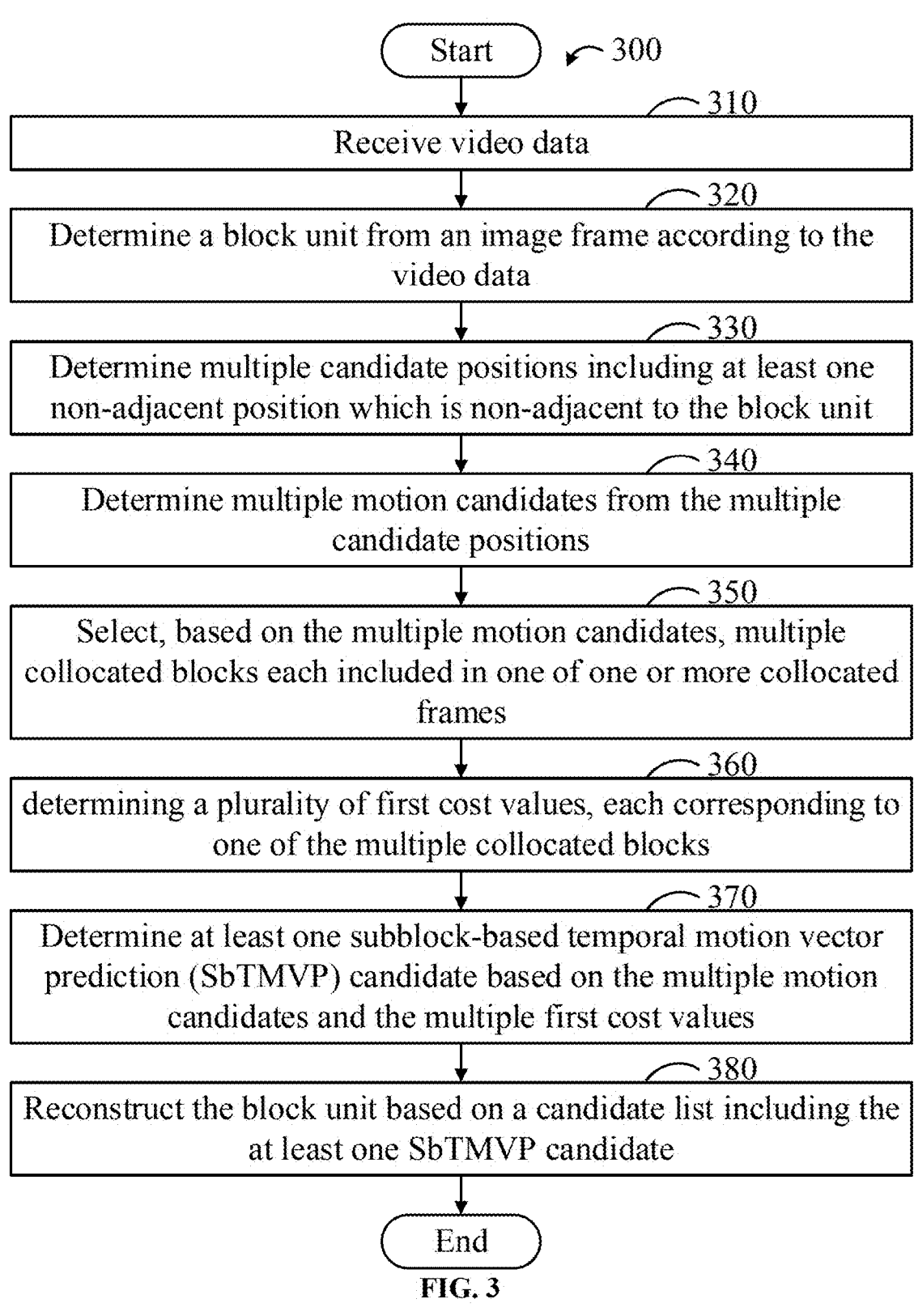
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there are a variety of ways of decoding the video data.

The method/process 300 may be performed by an electronic device using the configurations illustrated in FIGS. 1 and 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus may be different from what is illustrated. Additional blocks may be added or fewer blocks may be utilized without departing from the scope of the present disclosure.

At block 310, the method/process 300 may start by the decoder module 124 receiving the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

The entropy decoding unit 2241 may decode the bitstream to determine multiple prediction indications and multiple partitioning indications for multiple image frames. Then, the decoder module 124 may further reconstruct the multiple image frames based on the prediction indications and the partitioning indications. The prediction indications and the partitioning indications may include multiple flags and multiple indices.

At block 320, the decoder module 124 determines a block unit from an image frame according to the video data.

With reference to FIGS. 1 and 2, the decoder module 124 may determine the image frame based on the bitstream and divide the image frame to determine the block unit according to the partition indications in the bitstream. For example, the decoder module 124 may divide the image frames to generate multiple CTUs, and further divide one of the CTUs to determine the block unit according to the partition indications based on any video coding standard.

At block 330, the decoder module 124 determines multiple candidate positions including at least one non-adjacent position which is non-adjacent to the block unit.

The candidate positions may include multiple neighboring positions neighboring the block unit. The neighboring positions may be selected from at least one of multiple adjacent positions adjacent to the block unit or multiple non-adjacent positions non-adjacent to the block unit. Thus, in some implementations, the candidate positions may include at least one of the adjacent positions or the non-adjacent positions. In some implementations, the candidate positions may include at least one of the adjacent positions and at least one of the non-adjacent positions. In some implementations, the candidate positions may include at least one of the non-adjacent positions and exclude the adjacent positions. In some implementations, the candidate positions may exclude the non-adjacent positions and include at least one of the adjacent positions.

Figure 4:
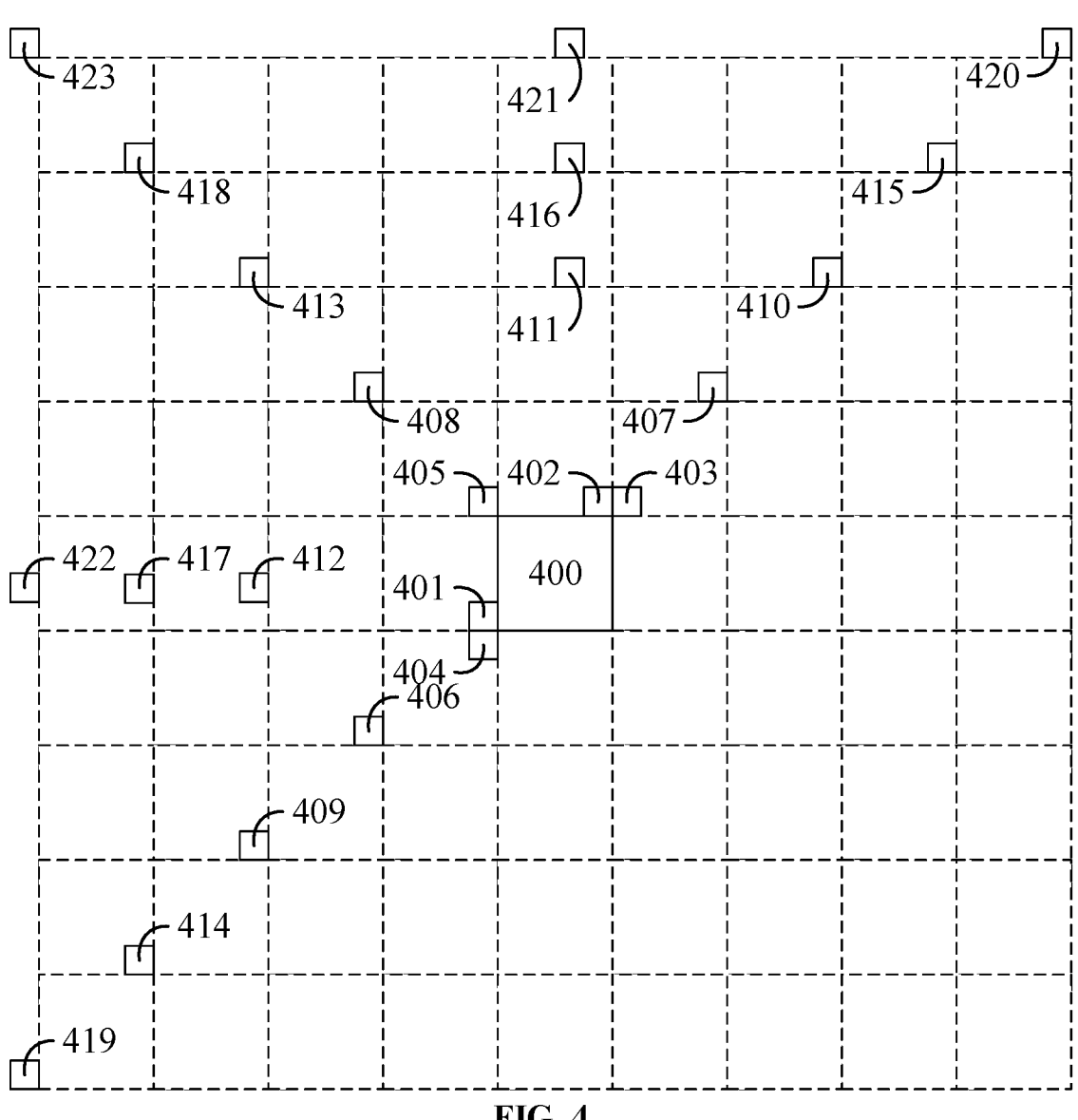
FIG. 4 is a schematic illustration of a block and multiple candidate positions, in accordance with one or more example implementations of this disclosure.

FIG. 4 is a schematic illustration of a block and multiple candidate positions, in accordance with one or more example implementations of this disclosure. With reference to FIGS. 1 and 2, the decoder module 124 may determine multiple adjacent positions 401-405 adjacent to a current block 400 and multiple non-adjacent positions 406-423 non-adjacent to block unit 400. Each of the adjacent positions 401-405 may be adjacent to one of the four corners of the block unit 400. In addition, a distance between the block unit 400 and one of the non-adjacent positions 406-423 may be based on one of a block height H, a block width W, or a diagonal length D of the block unit 400. For example, a horizontal distance and a vertical distance between a top-left position of the block unit 400 and the non-adjacent position 408 may be, respectively, equal to W+1 and H+1 of the block unit 400, and the distance between the block unit 400 and the non-adjacent position 411 may be equal to a distance value generated by adding one to twice of the block height H of the block unit 400.

At block 340, the decoder module 124 determines multiple motion candidates from the multiple candidate positions.

With reference to FIGS. 1 and 2, the decoder module 124 may determine multiple neighboring blocks neighboring the block unit based on the candidate positions. Each of the neighboring blocks may cover at least one of the candidate positions. Each of the candidate positions may be located at the top-left position of a corresponding one of the neighboring blocks In addition, the sizes of the neighboring blocks may be identical to the size of the block unit (e.g., the block height H, the block width W, or the diagonal length D).

The neighboring blocks determined based on one of the adjacent positions may cover one or more of the adjacent positions since some of the adjacent positions are adjacent to each other. The neighboring blocks determined based on one of the non-adjacent positions may cover one of the non-adjacent positions. Furthermore, since the distance between the non-adjacent positions may be greater than or equal to the size of the block unit, the neighboring blocks determined based on one of the non-adjacent positions may cover only one of the non-adjacent positions.

The decoder module 124 may determine a template region adjacent to the block unit from the image frame. The template region may include at least one of multiple adjacent regions. A first adjacent region may be an adjacent region located above the block unit, a second adjacent region may be an adjacent region located on the left side of the block unit, and a third adjacent region may be an adjacent region located on the top-left side of the block unit. The adjacent regions may be reconstructed prior to reconstructing the block unit. A height of the first adjacent region may be equal to a number R of the reconstructed samples of the first adjacent region along a vertical direction, and a width of the first adjacent region may be equal to a width of the block unit. A height of the second adjacent region may be equal to a height of the block unit, and a width of the second adjacent region may be equal to a number S of the reconstructed samples of the second adjacent region along a horizontal direction. In addition, a height of the third adjacent region may be equal to the number R of the reconstructed samples of the first adjacent region along the vertical direction, and a width of the third adjacent region may be equal to the number S of the reconstructed samples of the second adjacent region along the horizontal direction. In one implementation, the numbers R and S may be positive integers. In addition, the numbers R and S may be equal to or different from each other. Furthermore, the numbers R and S may be greater than or equal to one. In some implementations, the numbers R and S may be equal to one.

The decoder module 124 may determine the template region adjacent to the block unit. The decoder module 124 may use the adjacent regions as the template region for determining the motion candidates. In addition, the decoder module 124 may use two of the adjacent regions as the template region for determining the motion candidates. For example, the decoder module 124 may only use the first and second adjacent regions as the template region for determining the motion candidates. Furthermore, the decoder module 124 may use only one of the adjacent regions as the template region for determining the motion candidates.

The decoder module 124 may determine multiple neighboring regions from the image frame. Each of the neighboring regions may be adjacent to a corresponding one of the neighboring blocks. Each of the neighboring regions may include at least one of multiple adjacent regions of a corresponding one of the neighboring blocks. A first adjacent region of a specific one of the neighboring blocks may be an adjacent region located above the specific neighboring block, a second adjacent region of the specific neighboring block may be an adjacent region located on the left side of the specific neighboring block, and a third adjacent region of the specific neighboring block may be an adjacent region located on the top-left side of the specific neighboring block. The adjacent regions of the neighboring blocks may be reconstructed prior to reconstructing the block unit.

Figure 5A:
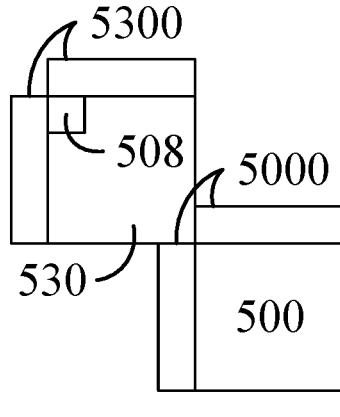
FIGS. 5A-5C are schematic illustrations of a template region and different neighboring regions, in accordance with one or more example implementations of this disclosure.
Figure 5B:
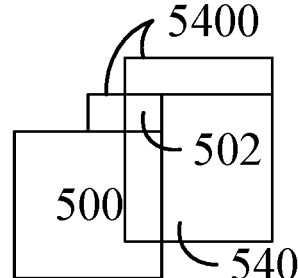
Figure 5C:
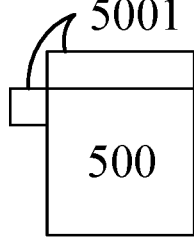

FIGS. 5A-5C are schematic illustrations of the template region and different neighboring regions, in accordance with one or more example implementations of this disclosure. FIG. 5A is a schematic illustration of a block unit 500, a neighboring block 530 covering the non-adjacent position 508, and a neighboring region 5300, in accordance with one or more example implementations of this disclosure. The size of the neighboring block 530 may be identical to the size of the block unit 500. Since the neighboring block 530 is located above and in the left side of the block unit 500 and uncovers the block unit 500, multiple samples in the neighboring block 530 may be multiple reconstructed samples reconstructed prior to the block unit 500. In addition, multiple samples in the neighboring region 5300 may be also multiple reconstructed samples reconstructed prior to the block unit 500.

FIG. 5B is a schematic illustration of the block unit 500, a neighboring block 540 covering the adjacent position 502, and a neighboring region 5400, in accordance with one or more example implementations of this disclosure. The size of the neighboring block 540 may be identical to the size of the block unit 500. However, since the neighboring position 502 is located adjacent to the top-right corner of the block unit 500, some of samples in the neighboring block 540 may be multiple reconstructed samples reconstructed prior to the block unit 500 and the other samples in the neighboring block 540 may be multiple unreconstructed samples. Thus, the decoder module 124 may determine a neighboring region 5400 which is smaller than the template region 5000 as shown in FIG. 5A for excluding a region covered by the block unit 500. Therefore, the neighboring region 5400 is located above and uncovers the block unit 500 so that multiple samples of the neighboring region 5400 may be also multiple reconstructed samples reconstructed prior to the block unit 500.

The decoder module 124 may determine a neighboring cost value based on the template region and each of the multiple neighboring regions by using a cost function to select the motion candidates for the block unit. In FIG. 5A, the decoder module 124 may directly compare the neighboring region 5300 of the neighboring block 530 with the template region 5000 of the block unit 500 by the cost function. For examples, the decoder module 124 may compare multiple neighboring samples in the neighboring region 5300 of the neighboring block 530 with the reconstructed samples in the template region 5000 of the block unit 500 to generate one of the neighboring cost values. However, since the neighboring region 5400 may be smaller than the template region 5000, the decoder module 124 may not directly compare the neighboring region 5400 of the neighboring block 540 with the template region 5000 of the block unit 500 by the cost function. FIG. 5C is a schematic illustration of the block unit 500 and a secondary region 5001, in accordance with one or more example implementations of this disclosure. The secondary region 5001 may be determined based on the size and the shape of the neighboring region 5400. The size and the shape of the secondary region 5001 may be identical to those of the neighboring region 5400. Thus, the decoder module 124 may directly compare the neighboring region 5400 of the neighboring block 540 with the template region 5001 of the block unit 500 by the cost function.

The cost function may a template matching cost function including, but not limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from the embodiments described in this disclosure.

The decoder module 124 may select multiple candidate blocks based on the neighboring cost values calculated by the neighboring regions. However, since the sizes of the neighboring regions may be identical to or different from each other, it may be unfair to directly compare the neighboring cost values with each other. The decoder module 124 may determine an averaged cost value for each of the neighboring blocks based on the sizes of the neighboring regions. For example, the averaged cost value for the neighboring block 530 may be calculated by dividing the neighboring cost value of the neighboring region 5300 by 8, and the averaged cost value for the neighboring block 540 may be calculated by dividing the neighboring cost value of the neighboring region 5400 by 5. Thus, the decoder module 124 may compare the averaged cost values with each other to select some of the neighboring positions for determining the candidate blocks.

When the number of the selected neighboring positions is equal to three, three neighboring positions corresponding to three neighboring blocks having the three lowest averaged cost values may be selected and the motion candidates may include motion information of three candidate blocks covering the three neighboring positions. When the number of the selected neighboring positions is equal to one, one neighboring position corresponding to one neighboring block having the lowest averaged cost value may be selected and the motion candidates may include motion information of one candidate block covering the one neighboring position. Thus, when the number of the selected neighboring positions is equal to Y, Y neighboring positions may be selected based on the Y lowest averaged cost values to determine Y candidate blocks. The number Y may be a positive integer.

The candidate blocks may be a reconstructed block reconstructed prior to reconstructing the block unit. When one of the candidate blocks does not have motion information, the motion candidate may not be determined based on a corresponding one the selected neighboring positions. For example, when one of the candidate blocks is an intra-predictive block, the one of the candidate blocks does not have any motion information to be added into the motion candidates. In addition, the motion candidate may further include a history-based candidate determined from a first-in-first-out (FIFO) table storing multiple previous motion information of multiple previous blocks reconstructed prior to reconstructing the block unit.

At block 350, the decoder module 124 selects, based on the multiple motion candidates, multiple collocated blocks each included in one of one or more collocated frames.

Each of the multiple motion candidates may indicate a motion vector, list information, and frame information of a candidate block covering one of the multiple candidate positions. In addition, the motion vector, the list information, and the frame information of a specific one of the candidate blocks may be used to predict the specific candidate block for reconstructing the specific candidate block.

The list information of the specific candidate block may include at least one of an inter prediction indication or multiple list prediction flags. The inter prediction indication may indicate which one of a first uni-prediction with a first reference list List0, a second uni-prediction with a second reference list List1, and a bi-prediction including the first reference list List0 and the second reference list List1 is used for the specific candidate block. In addition, the list prediction flags may include a first list prediction flag used for determining whether the first reference list List0 is used for the specific candidate block and a second list prediction flag used for determining whether second reference list List1 is used for the specific candidate block. In some implementations, the list information of the specific candidate block may include both of the inter prediction indication and the multiple list prediction flags for determining the reference list of the specific candidate block. In addition, the list information of the specific candidate block may only include the inter prediction indication for determining the reference list of the specific candidate block. Furthermore, the list information of the specific candidate block may only include the multiple list prediction flags for determining the reference list of the specific candidate block.

The frame information may include at least one frame index. When the specific candidate block is a bi-predictive block, the frame information of the specific candidate block may include two frame indices for indicating two reference frames respectively included in a corresponding one of the reference lists. In addition, when the specific candidate block is a uni-predictive block, the frame information of the specific candidate block may include only one frame index for indicating one reference frame included in a corresponding one of the reference lists. In some other implementations, when the specific candidate block is a uni-predictive block, the frame information of the specific candidate block may also include two frame indices. One of the two frame indices may be used to indicate one reference frame included in a corresponding one of the reference lists, and the other one of the two frame indices may be equal to a predetermined frame value for indicating that the other one of the reference lists is not used for the specific candidate block.

With reference to FIGS. 1 and 2, the decoder module 124 may determine the one or more collocated frames based on at least one predefined value. When one of the frame indices in the frame information of the specific candidate block is equal to one of the at least one predefined value, a reference frame of the specific candidate block selected from a corresponding one of the reference lists indicated by the list information of the specific candidate block may be included in the one or more collocated frame. For example, the at least one predefined value may include zero. In some implementations, the specific candidate block may be a uni-predictive block predicted based on the second reference list List1. When a second frame index of the specific candidate block corresponding to the second reference list List1 is equal to zero, the reference frame of the specific candidate block selected from the second reference list List1 based on the second frame index may be included in the one or more collocated frame. However, the reference frame of the specific candidate block selected from the second reference list List1 may be excluded from the one or more collocated frame when the second frame index in the frame information of the specific candidate block is different from at least one predefined value. Thus, the reference frame of the specific candidate block may be added into or excluded from the one or more collocated frame based on the frame information.

In some implementations, the specific candidate block may be a bi-predictive block predicted based on the first reference list List0 and the second reference list List1. In addition, some of multiple reference candidates in the first reference list List0 may be identical to some of multiple reference candidates in the second reference list List1. Thus, the first reference frame of the specific candidate block selected from the first reference list List0 based on the first frame index may be identical to the second reference frame of the specific candidate block selected from the second reference list List1 based on the second frame index. Therefore, the number of the reference frames of the specific candidate block determined from the two reference lists may be equal to one or two when the specific candidate block is a bi-prediction block.

When a first frame index of the specific candidate block corresponding to the first reference list List0 is equal to zero, a first reference frame of the specific candidate block selected from the first reference list List0 based on the first frame index may be included in the one or more collocated frame. In addition, when a second frame index of the specific candidate block corresponding to the second reference list List1 is equal to zero, a second reference frame of the specific candidate block selected from the second reference list List1 based on the second frame index may also be included in the one or more collocated frame. However, the reference frame of the specific candidate block may be excluded from the one or more collocated frame when the frame index in the frame information of the specific candidate block is different from at least one predefined value. Thus, the number of the reference frames of the specific candidate block which are added into the one or more collocated frame may be equal to zero, one, or two when the specific candidate block is a bi-predictive block.

In some implementations, the decoder module 124 may use a specific one of the motion candidates corresponding to the specific candidate block to determine a motion block when the reference frame selected by the frame information in the specific motion candidate is included in the one or more collocated frames. The decoder module 124 may select the motion block from the reference frame indicated by the specific motion candidate based on the motion vector in the specific motion candidate. The motion block of the specific motion candidate in the reference frame may be indicated by the motion vector of the specific motion candidate from the block unit. Thus, when one of the frame indices in the motion candidates is equal to one of the at least one predefined value, the decoder module 124 may determine a motion block for the one of the frame indices. The number of the motion blocks may be equal to the number of the frame indices of the motion candidates being equal to the one of the at least one predefined value. Each of the motion blocks may be regarded as a collocated block. Therefore, each of the collocated blocks may be selected from a reference frame of a corresponding one of the candidate blocks based on a corresponding one of the motion vectors and a corresponding one of the candidate positions.

In some implementations, the decoder module 124 may directly use the motion vectors of the motion candidates to determine the motion blocks in each of the one or more collocated frame. The one or more collocated frame may be directly selected from the first reference list List0 and the second reference list List1 based on the at least one predefined value. The motion blocks selected by a specific one of the motion candidates are indicated in each of the one or more collocated frame by the motion vector of the specific motion candidate from the block unit. Thus, the specific motion candidate may be used to generate more than one motion block respectively included in different collocated frames.

In some implementations, since the number of the motion blocks generated based on the motion vector in the specific motion candidate may be greater than one, the decoder module 124 may determine a motion cost value for each of the motion blocks generated in different collocated frames based on the same motion vector. The motion cost value may be determined by a template matching cost function. The decoder module 124 may determine a motion region for each of the motion blocks generated based on the same motion vector and compare the motion regions with the template region of the block unit. Then, the decoder module 124 may compare the motion cost values of the motion blocks generated in different collocated frames based on the same motion vector with each other to select only one of the one or more collocated frame including one of the motion blocks for the motion vector of the specific motion candidate. Thus, the one of the motion blocks for the specific motion candidate may be set as a collocated block for further comparing with other collocated blocks of the other motion candidates. Therefore, the number of the collocated blocks may be equal to the number of the frame indices being equal to one of at least one predefined value.

In some implementations, the motion blocks generated in different collocated frames based on the same motion vector may not be compared with each other. The decoder module 124 may generate all of the motion blocks in the one or more collocated frames based on all of the motion candidates and set all of the motion blocks as the collocated blocks. Therefore, the number of the collocated blocks may be equal to a quantity generated by multiplying the number of the frame indices being equal to one of at least one predefined value with the number of the one or more collocated frame, since the number of the motion vectors for determining the collocated blocks may be equal to the number of the frame indices being equal to one of at least one predefined value.

Returning to FIG. 3, at block 360, the decoder module 124 determines multiple first cost values, each corresponding to one of the multiple collocated blocks units.

With reference to FIGS. 1 and 2, the decoder module 124 may determine, from the one or more collocated frame, multiple collocated regions each adjacent to one of the multiple collocated blocks. Each of the collocated regions may include at least one of multiple adjacent regions of a corresponding one of the collocated blocks. A first adjacent region of a specific one of the collocated blocks may be an above adjacent region located above the collocated neighboring block, a second adjacent region of the specific collocated block may be a left adjacent region located on the left side of the specific collocated block, and a third adjacent region of the specific collocated block may be an above-left adjacent region located on the top-left side of the specific collocated block The adjacent regions of the collocated blocks may be reconstructed prior to reconstructing the block unit since each of the one or more collocated frame is reconstructed prior to reconstructing the block unit.

Figure 6:
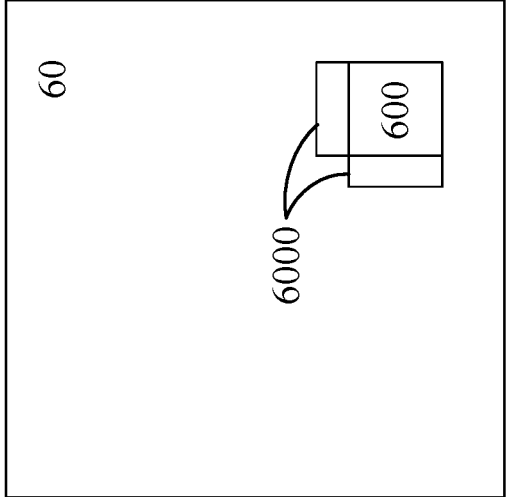
FIG. 6 is a schematic illustration of the image frame having the block unit and the template region, and the collocated frames having the collocated blocks and the collocated regions, in accordance with one or more example implementations of this disclosure.
Figure 6:
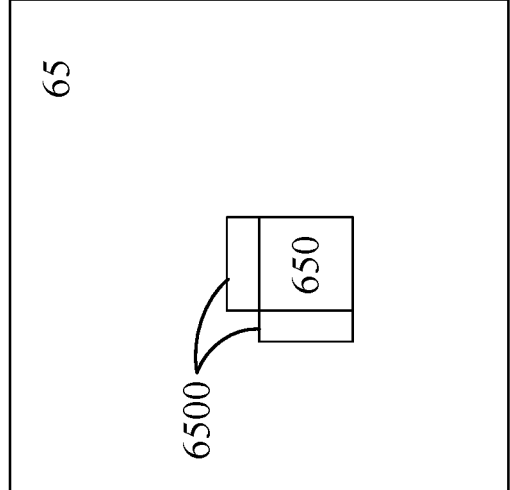
Figure 6:
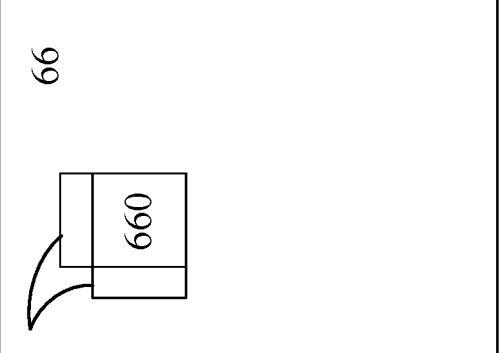

FIG. 6 is a schematic illustration of the image frame 60 having the block unit 600 and the template region 6000, and the collocated frames 65-66 having the collocated blocks 650-660 and the collocated regions 6500-6600, in accordance with one or more example implementations of this disclosure. The size of the collocated blocks 650 and 660 may be identical to the size of the block unit 600, and the size of the collocated regions 6500 and 6600 may be identical to the size of the template region 6000. In addition, multiple samples in the collocated blocks 650 and 660 and the collocated regions 6500 and 6600 may be also reconstructed samples reconstructed prior to the block unit 600.

The decoder module 124 may determine a collocated cost value based on the template region and each of the multiple collocated regions by using a cost function. In FIG. 6, the decoder module 124 may directly compare the collocated region 6500 of the collocated block 650 and the collocated region 6600 of the collocated block 660 with the template region 6000 of the block unit 600 by the cost function. For examples, the decoder module 124 may compare multiple collocated samples in the collocated region 6500 of the neighboring block 650 with the reconstructed samples in the template region 6000 of the block unit 600 to generate one of the collocated cost values.

The cost function may a template matching cost function including, but not limited to, SAD, SAT), MAD, MSD, and SSIM. It should be noted that any cost function may be used without departing from the embodiments described in this disclosure.

In order to distinguish the collocated cost values, the neighboring cost values, the averaged cost values, and the motion cost values from each other, the collocated cost values may be regarded as the first cost values, the neighboring cost values may be regarded as multiple second cost values, the averaged cost values may be regarded as multiple third cost values, and the motion cost values may be regarded as multiple fourth cost values. Since the second cost values and the third cost values may be used for determining the motion candidates only in some implementations of the method 300, it may be unnecessary to use the second cost values and the third cost values in the method

300. Since the fourth cost values may be used for determining the collocated blocks in some implementations of the method 300, it may be unnecessary to use the fourth cost values in the method 300. In some implementations, all of the second cost values, the third cost values, and the fourth cost values may be used in method 300 for determining the motion candidates and determining the collocated blocks.

At block 370, the decoder module 124 determines at least one subblock-based temporal motion vector prediction (SbTMVP) candidate based on the multiple motion candidates and the multiple first cost values.

The decoder module 124 may select at least one of the collocated blocks based on the first cost values calculated by the collocated regions. When the number of the selected at least one collocated blocks is equal to four, four collocated blocks having the four lowest one of the first cost values may be selected and the decoder module 124 may determine motion information of the four collocated blocks as four collocated candidates. When the number of the selected at least one collocated blocks is equal to one, the collocated block having the lowest collocated cost value may be selected and the decoder module 124 may determine motion information of the selected collocated block as a collocated candidate. Thus, when the number of the selected at least one collocated blocks is equal to Y, Y collocated blocks may be selected based on the Y lowest one of the collocated cost values to determine Y collocated candidates. The number Y may be a positive integer. Each of the at least one collocated candidate may indicate motion information, list information, and frame information for a corresponding one of the at least one collocated block.

Each of the at least one SbTMVP candidate may be determined based on a corresponding one of the at least one collocated candidate. The decoder module 124 may determine a collocated distance between a reference frame of a specific one of the selected at least one collocated block and a specific one of the collocated frames including the specific selected collocated block. The reference frame of the specific selected collocated block may be indicated by the motion information (e.g., collocated candidate) of the specific selected collocated block. In addition, the decoder module 124 may determine a reference distance between a reference frame of the block unit and the image frame. Then, the motion information of a specific one of the at least one SbTMVP candidate may be determined based on a corresponding one of the collocated distances, a corresponding one of the reference distances and the motion information in a corresponding one of collocated candidate. In some implementations, a reference frame of the block unit may be a corresponding one of the one or more collocated block for determining a corresponding one of the at least one SbTMVP candidate.

Returning to FIG. 3, at block 380, the decoder module 124 reconstructs the block unit based on a candidate list including the at least one SbTMVP candidate.

With reference to FIGS. 1 and 2, the decoder module 124 may select, based on a prediction index, a prediction candidate from the candidate list. The prediction index may indicate the prediction candidate of the block unit from the candidate list. Thus, the decoder module 124 may generate a predicted block of the block unit based on the prediction candidate selected from the candidate list. In some implementations, the candidate list may be a merge list including multiple merge candidates, and the at least one SbTMVP candidate may be included in the merge candidates. In some implementations, the candidate list may be a subblock merge list including multiple subblock merge candidates, and the at least one SbTMVP candidate may be included in the sub-block merge candidates. In some implementations, the prediction index may be an index SbTMVP_idx to determine a selected one of the SbTMVP candidates when the candidate list only includes the SbTMVP candidates.

The decoder module 124 may further add multiple residual components into the prediction block to reconstruct the block unit. The residual components may be determined from the bitstream. The decoder module 124 may reconstruct all of the other block units in the image frame for reconstructing the image frame and the video data.

Another method M1 similar to the method 300 may be performed using the configurations illustrated in FIGS. 1 and 2, and various elements of these figures are referenced with regard to the method 300.

In the method M1, the decoder module 124 may decode the video data based on the method 300. In addition, at block 370, after selecting at least one of the collocated blocks, the decoder module 124 further determine multiple shift blocks each neighboring one of the selected at least one collocated block. In some implementations, each of the shift blocks may be selected based on multiple neighboring positions including multiple adjacent positions and multiple non-adjacent positions as shown in FIG. 4. In some implementations, each of the shift blocks may be selected based on multiple neighboring positions including four directional positions (e.g., an upper position, a lower position, a left position, and a right position). In some implementations, each of the shift blocks may be selected based on multiple neighboring positions including eight directional positions (e.g., an upper position, a lower position, a left position, a right position, an upper-left position, an upper-right position, a lower-left position, and a lower-right position).

Figure 7:
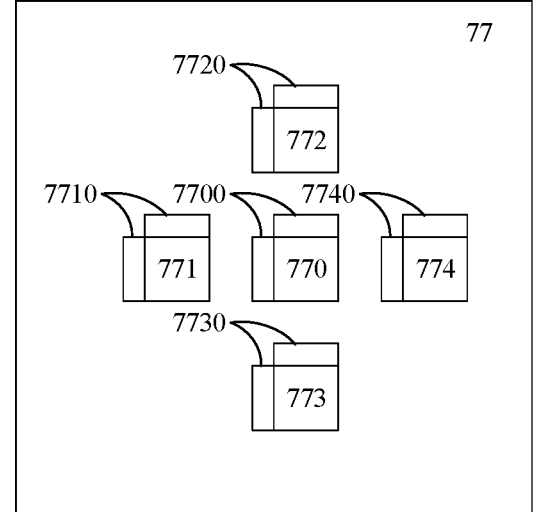
FIG. 7 is a schematic illustration of the image frame having the block unit and the template region, and the collocated frame having the collocated block, the shift blocks, and the collocated regions, in accordance with one or more example implementations of this disclosure.
Figure 7:
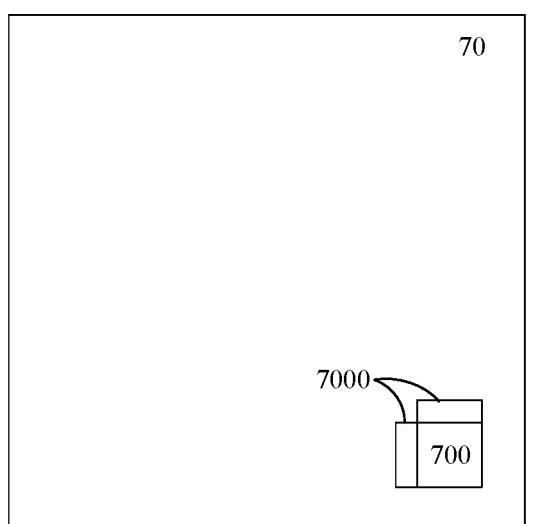

FIG. 7 is a schematic illustration of the image frame 70 having the block unit 700 and the template region 7000, and the collocated frame 77 having the collocated block 770, the shift blocks 771-774 and the collocated regions 7700-7740, in accordance with one or more example implementations of this disclosure. The size of the collocated block 770 and the shift blocks 771-774 may be identical to the size of the block unit 700, and the size of the collocated regions 7700-7740 may be identical to the size of the template region 7000. In addition, multiple samples in the collocated block 770, the shift blocks 771-774 and the collocated regions 7700-7740 may be also reconstructed samples reconstructed prior to the block unit 700.

The decoder module 124 may determine a shift cost value based on the template region and each of the multiple collocated regions by using a cost function. In FIG. 7, the decoder module 124 may directly compare each of the collocated regions 7700-7740 with the template region 7000 of the block unit 700 by the cost function. For examples, the decoder module 124 may compare multiple collocated samples in the collocated region 7740 of the shift block 740 with the reconstructed samples in the template region 7000 of the block unit 700 to generate one of the shift cost values. When one of the shift cost values determined based on the collocated regions of the shift block is less than the shift cost value determined based on the collocated region of the collocated block, the corresponding one of the shift blocks may replace the collocated block for determining the collocated candidate. Thus, the collocated candidate may indicate a motion vector, list information, and frame information for the corresponding one of the shift block. The method/process 300 may then end.

Figure 8:
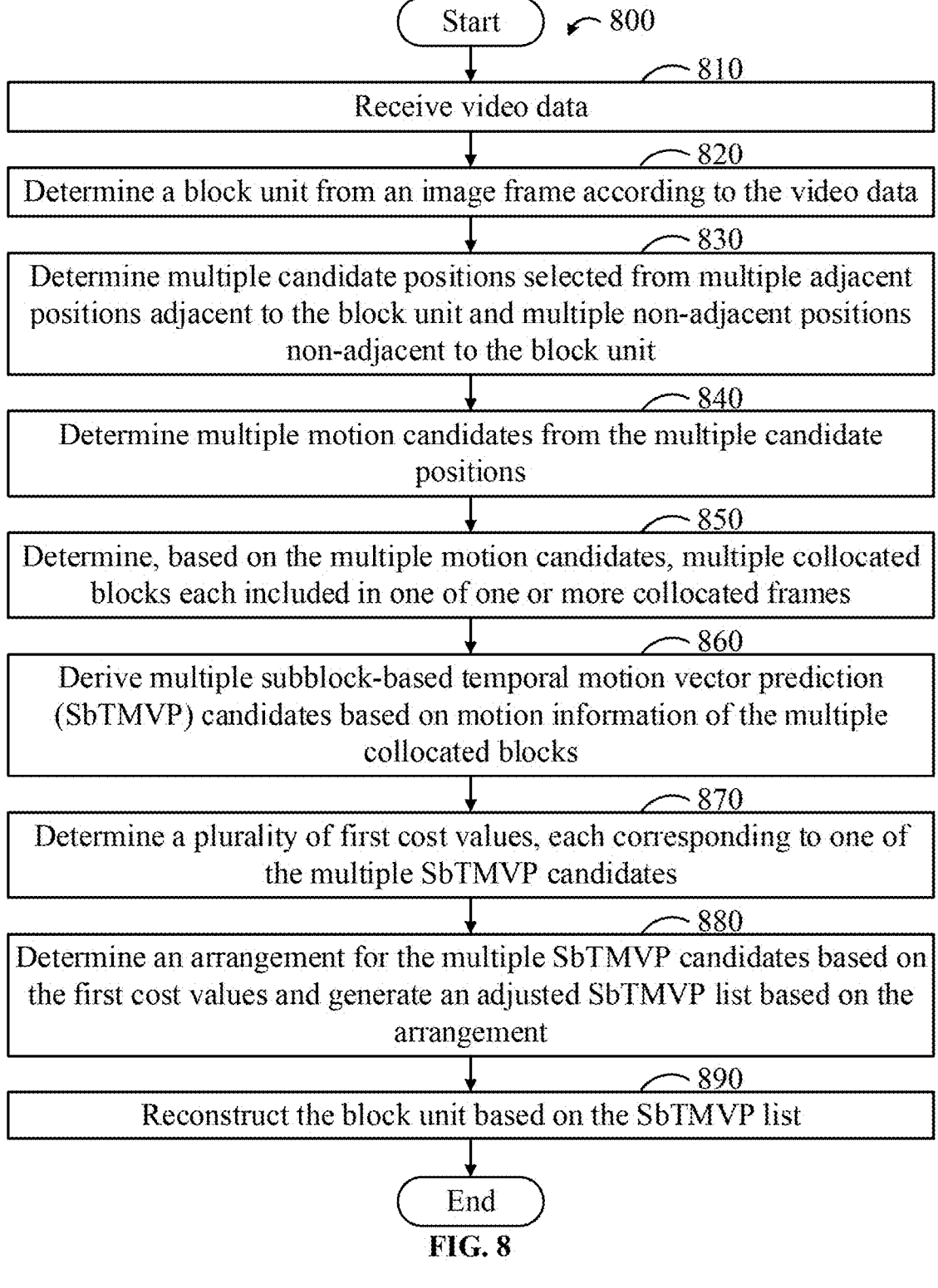
FIG. 8 is a flowchart illustrating a method/process for decoding and/or encoding video data by an electronic device, in accordance with one or more example implementations of this disclosure.

FIG. 8 is a flowchart illustrating a method/process 800 for decoding and/or encoding video data by an electronic device, in accordance with one or more example implementations of this disclosure. The method/process 800 is an example implementation, as there are a variety of ways of decoding the video data.

The method/process 800 may be performed by an electronic device using the configurations illustrated in FIGS. 1 and 2, where various elements of these figures may be referenced to describe the method/process 800. Each block illustrated in FIG. 8 may represent one or more processes, methods, or subroutines performed by an electronic device.

The order in which the blocks appear in FIG. 8 is for illustration only, and may not be construed to limit the scope of the present disclosure, thus may be different from what is illustrated. Additional blocks may be added or fewer blocks may be utilized without departing from the scope of the present disclosure.

At block 810, the method/process 800 may start by the decoder module 124 receiving the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

The entropy decoding unit 2241 may decode the bitstream to determine multiple prediction indications and multiple partitioning indications for multiple image frames. Then, the decoder module 124 may further reconstruct the multiple image frames based on the prediction indications and the partitioning indications. The prediction indications and the partitioning indications may include multiple flags and multiple indices.

At block 820, the decoder module 124 determines a block unit from an image frame according to the video data.

With reference to FIGS. 1 and 2, the decoder module 124 may determine the image frame based on the bitstream and divide the image frame to determine the block unit according to the partition indications in the bitstream. For example, the decoder module 124 may divide the image frames to generate multiple CTUs, and further divide one of the CTUs to determine the block unit according to the partition indications based on any video coding standard.

At block 830, the decoder module 124 determines multiple candidate positions selected from multiple adjacent positions adjacent to the block unit and multiple non-adjacent positions non-adjacent to the block unit.

The candidate positions may be multiple neighboring positions neighboring the block unit. The neighboring positions may be selected from at least one of multiple adjacent positions adjacent to the block unit or multiple non-adjacent positions non-adjacent to (or not being adjacent to) the block unit. Thus, in some implementations, the candidate positions may include at least one of the adjacent positions or the non-adjacent positions. In some implementations, the candidate positions may include at least one of the adjacent positions and at least one of the non-adjacent positions. In some implementations, the candidate positions may include at least one of the non-adjacent positions and exclude the adjacent positions. In some implementations, the candidate positions may exclude the non-adjacent positions and include at least one of the adjacent positions.

With reference to FIGS. 1, 2 and 4, the decoder module 124 may determine multiple adjacent positions 401-405 adjacent to a current block 400 and multiple non-adjacent positions 406-423 non-adjacent to block unit 400. Each of the adjacent positions 401-405 may be adjacent to one of the four corners of the block unit 400. In addition, a distance between the block unit 400 and one of the non-adjacent positions 406-423 may be based on one of a block height H, a block width W, or a diagonal length D of the block unit 400. For example, a horizontal distance and a vertical distance between a top-left position of the block unit 400 and the non-adjacent position 408 may be respectively equal to W+1 and H+1 of the block unit 400, and the distance between the block unit 400 and the non-adjacent position 411 may be equal to a distance value generated by adding one to twice of the block height H of the block unit 400.

At block 840, the decoder module 124 determines multiple motion candidates from the multiple candidate positions.

With reference to FIGS. 1 and 2, the decoder module 124 may determine multiple neighboring blocks neighboring the block unit based on the candidate positions. Each of the neighboring blocks may cover at least one of the candidate positions. Each of the candidate positions may be located at the top-left position of a corresponding one of the neighboring blocks. In addition, the sizes of the neighboring blocks may be identical to the size of the block unit (i.e., the block height H, the block width W, or the diagonal length D).

The neighboring blocks determined based on one of the adjacent positions may cover one or more of the adjacent positions since some of the adjacent positions are adjacent to each other. The neighboring blocks determined based on one of the non-adjacent positions may cover one of the non-adjacent positions. Furthermore, since the distance between the non-adjacent positions may be greater than or equal to the size of the block unit, the neighboring blocks determined based on one of the non-adjacent positions may cover only one of the non-adjacent positions.

The decoder module 124 may determine a template region adjacent to the block unit from the image frame. The template region may include at least one of multiple adjacent regions. A first adjacent region may be an adjacent region located above the block unit, a second adjacent region may be an adjacent region located on the left side of the block unit, and a third adjacent region may be an adjacent region located on the top-left side of the block unit. The adjacent regions may be reconstructed prior to reconstructing the block unit. A height of the first adjacent region may be equal to a number R of the reconstructed samples of the first adjacent region along a vertical direction, and a width of the first adjacent region may be equal to a width of the block unit. A height of the second adjacent region may be equal to a height of the block unit, and a width of the second adjacent region may be equal to a number S of the reconstructed samples of the second adjacent region along a horizontal direction. In addition, a height of the third adjacent region may be equal to the number R of the reconstructed samples of the first adjacent region along the vertical direction, and a width of the third adjacent region may be equal to the number S of the reconstructed samples of the second adjacent region along the horizontal direction. In one implementation, the numbers R and S may be positive integers. In addition, the numbers R and S may be equal to or different from each other. Furthermore, the numbers R and S may be greater than or equal to one. In some implementations, the numbers R and S may be equal to one.

The decoder module 124 may determine the template region adjacent to the block unit. The decoder module 124 may use the adjacent regions as the template region for determining the motion candidates. In addition, the decoder module 124 may use two of the adjacent regions as the template region for determining the motion candidates. For example, the decoder module 124 may only use the first and second adjacent regions as the template region for determining the motion candidates. Furthermore, the decoder module 124 may use only one of the adjacent regions as template region for determining the motion candidates.

The decoder module 124 may determine multiple neighboring regions from the image frame. Each of the neighboring regions may be adjacent to a corresponding one of the neighboring blocks. Each of the neighboring regions may include at least one of multiple adjacent regions of a corresponding one of the neighboring blocks. A first adjacent region of a specific one of the neighboring blocks may be an adjacent region located above the specific neighboring block, a second adjacent region of the specific neighboring block may be an adjacent region located on the left side of the specific neighboring block, and a third adjacent region of the specific neighboring block may be an adjacent region located on the top-left side of the specific neighboring block. The adjacent regions of the neighboring blocks may be reconstructed prior to reconstructing the block unit.

With reference to FIG. 5A, the size of the neighboring block 530 may be identical to the size of the block unit 500. Since the neighboring block 530 is located above and in the left side of the block unit 500 and uncovers the block unit 500, multiple samples in the neighboring block 530 may be multiple reconstructed samples reconstructed prior to the block unit 500. In addition, multiple samples in the neighboring region 5300 may be also multiple reconstructed samples reconstructed prior to the block unit 500.

With reference to FIG. 5B, the size of the neighboring block 540 may be identical to the size of the block unit 500. However, since the neighboring position 502 is located adjacent to the top-right corner of the block unit 500, some of samples in the neighboring block 540 may be multiple reconstructed samples reconstructed prior to the block unit 500 and the other samples in the neighboring block 540 may be multiple unreconstructed samples. Thus, the decoder module 124 may determine a neighboring region 5400 which is smaller than the template region 5000 as shown in FIG. 5A for excluding a region covered by the block unit 500. Therefore, the neighboring region 5400 is located above and uncovers the block unit 500 so that multiple samples of the neighboring region 5400 may be also multiple reconstructed samples reconstructed prior to the block unit 500.

The decoder module 124 may determine a neighboring cost value based on the template region and each of the multiple neighboring regions by using a cost function to select the motion candidates for the block unit. In FIG. 5A, the decoder module 124 may directly compare the neighboring region 5300 of the neighboring block 530 with the template region 5000 of the block unit 500 by the cost function. For examples, the decoder module 124 may compare multiple neighboring samples in the neighboring region 5300 of the neighboring block 530 with the reconstructed samples in the template region 5000 of the block unit 500 to generate one of the neighboring cost values. However, since the neighboring region 5400 may be smaller than the template region 5000, the decoder module 124 may not directly compare the neighboring region 5400 of the neighboring block 540 with the template region 5000 of the block unit 500 by the cost function. With reference to FIG. 5C, a secondary region 5001 may be determined based on the size and the shape of the neighboring region 5400. The size and the shape of the secondary region 5001 may be identical to those of the neighboring region 5400. Thus, the decoder module 124 may directly compare the neighboring region 5400 of the neighboring block 540 with the template region 5001 of the block unit 500 by the cost function.

The cost function may a template matching cost function including, but not limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from the embodiments described in this disclosure.

The decoder module 124 may select multiple candidate blocks based on the neighboring cost values calculated by the neighboring regions. However, since the sizes of the neighboring regions may be identical to or different from each other, it may be unfair to directly compare the neighboring cost values with each other. The decoder module 124 may determine an averaged cost value for each of the neighboring blocks based on the sizes of the neighboring regions. For example, the averaged cost value for the neighboring block 530 may be calculated by dividing the neighboring cost value of the neighboring region 5300 by 8, and the averaged cost value for the neighboring block 540 may be calculated by dividing the neighboring cost value of the neighboring region 5400 by 5. Thus, the decoder module 124 may compare the averaged cost values with each other to select some of the neighboring positions for determining the candidate blocks.

When the number of the selected neighboring positions is equal to three, three neighboring positions corresponding to three neighboring blocks having the three lowest averaged cost values may be selected and the motion candidates may include motion information of three candidate blocks covering the three neighboring positions. When the number of the selected neighboring positions is equal to one, one neighboring position corresponding to one neighboring block having the lowest averaged cost value may be selected and the motion candidates may include motion information of one candidate block covering the one neighboring position. Thus, when the number of the selected neighboring positions is equal to Y, Y neighboring positions may be selected based on the Y lowest averaged cost values to determine Y candidate blocks. The number Y may be a positive integer.

The candidate blocks may be a reconstructed block reconstructed prior to reconstructing the block unit. When one of the candidate blocks does not have motion information, the motion candidate may not be determined based on a corresponding one the selected neighboring positions. For example, when one of the candidate blocks is an intra-predictive block, the one of the candidate blocks does not have any motion information to be added into the motion candidates. In addition, the motion candidate may further include a history-based candidate determined from a first-in-first-out (FIFO) table storing multiple previous motion information of multiple previous blocks reconstructed prior to reconstructing the block unit.

Returning to FIG. 8, at block 850, the decoder module 124 determines, based on the multiple motion candidates, multiple collocated blocks each included in one of one or more collocated frames.

Each of the multiple motion candidates may indicate a motion vector, list information, and frame information of a candidate block covering one of the multiple candidate positions. In addition, the motion vector, the list information, and the frame information of a specific one of the candidate blocks may be used to predict the specific candidate block for reconstructing the specific candidate block.

The list information of the specific candidate block may include at least one of an inter prediction indication or multiple list prediction flags. The inter prediction indication may indicate which one of a first uni-prediction with a first reference list List0, a second uni-prediction with a second reference list List1, and a bi-prediction including the first reference list List0 and the second reference list List1 is used for the specific candidate block. In addition, the list prediction flags may include a first list prediction flag used for determining whether the first reference list List0 is used for the specific candidate block and a second list prediction flag used for determining whether second reference list List1 is used for the specific candidate block. In some implementations, the list information of the specific candidate block may include both of the inter prediction indication and the multiple list prediction flags for determining the reference list of the specific candidate block. In addition, the list information of the specific candidate block may only include the inter prediction indication for determining the reference list of the specific candidate block. Furthermore, the list information of the specific candidate block may only include the multiple list prediction flags for determining the reference list of the specific candidate block.

The frame information may include at least one frame index. When the specific candidate block is a bi-predictive block, the frame information of the specific candidate block may include two frame indices for indicating two reference frames respectively included in a corresponding one of the reference lists. In addition, when the specific candidate block is a uni-predictive block, the frame information of the specific candidate block may include only one frame index for indicating one reference frame included in a corresponding one of the reference lists. In another implementations, when the specific candidate block is a uni-predictive block, the frame information of the specific candidate block may also include two frame indices. One of the two frame indices may be used to indicate one reference frame included in a corresponding one of the reference lists, and the other one of the two frame indices may be equal to a predetermined frame value for indicating that the other one of the reference lists is not used for the specific candidate block.

With reference to FIGS. 1 and 2, the decoder module 124 may determine the one or more collocated frame based on at least one predefined value. When one of the frame indices in the frame information of the specific candidate block is equal to one of the at least one predefined value, a reference frame of the specific candidate block selected from a corresponding to the reference lists indicated by the list information of the specific candidate block may be included in the one or more collocated frame. For example, the at least one predefined value may include zero. In some implementations, the specific candidate block may be a uni-predictive block predicted based on the second reference list List1. When a second frame index of the specific candidate block corresponding to the second reference list List1 is equal to zero, the reference frame of the specific candidate block selected from the second reference list List1 based on the second frame index may be included in the one or more collocated frame. However, the reference frame of the specific candidate block selected from the second reference list List1 may be excluded from the one or more collocated frame when the second frame index in the frame information of the specific candidate block is different from at least one predefined value. Thus, the reference frame of the specific candidate block may be added into or excluded from the one or more collocated frame based on the frame information.

In some implementations, the specific candidate block may be a bi-predictive block predicted based on the first reference list List0 and the second reference list List1. In addition, some of multiple reference candidates in the first reference list List0 may be identical to some of multiple reference candidates in the second reference list List1. Thus, the first reference frame of the specific candidate block selected from the first reference list List0 based on the first frame index may be identical to the second reference frame of the specific candidate block selected from the second reference list List1 based on the second frame index. Therefore, the number of the reference frames of the specific candidate block determined from the two reference lists may be equal to one or two when the specific candidate block is a bi-prediction block.

When a first frame index of the specific candidate block corresponding to the first reference list List0 is equal to zero, a first reference frame of the specific candidate block selected from the first reference list List0 based on the first frame index may be included in the one or more collocated frame. In addition, when a second frame index of the specific candidate block corresponding to the second reference list List1 is equal to zero, a second reference frame of the specific candidate block selected from the second reference list List1 based on the second frame index may also be included in the one or more collocated frame. However, the reference frame of the specific candidate block may be excluded from the one or more collocated frame when the frame index in the frame information of the specific candidate block is different from at least one predefined value. Thus, the number of the reference frames of the specific candidate block which are added into the one or more collocated frame may be equal to zero, one, or two when the specific candidate block is a bi-predictive block.

In some implementations, the decoder module 124 may use a specific one of the motion candidates corresponding to the specific candidate block to determine a motion block when the reference frame selected by the frame information in the specific motion candidate is included in the one or more collocated frame. The decoder module 124 may select the motion block from the reference frame indicated by the specific motion candidate based on the motion vector in the specific motion candidate. The motion block of the specific motion candidate in the reference frame is indicated by the motion vector of the specific motion candidate from the block unit. Thus, when one of the frame indices in the motion candidates is equal to one of the at least one predefined value, the decoder module 124 may determine a motion block for the one of the frame indices. The number of the motion blocks may be equal to the number of the frame indices of the motion candidates being equal to the one of the at least one predefined value. Each of the motion blocks may be regarded as a collocated block. Therefore, each of the collocated blocks may be selected from a reference frame of a corresponding one of the candidate blocks based on a corresponding one of the motion vectors and a corresponding one of the candidate positions.

In some implementations, the decoder module 124 may directly use the motion vectors of the motion candidates to determine the motion blocks in each of the one or more collocated frame. The one or more collocated frame may be directly selected from the first reference list List0 and the second reference list List1 based on the at least one predefined value. The motion blocks selected by a specific one of the motion candidates are indicated in each of the one or more collocated frame by the motion vector of the specific motion candidate from the block unit. Thus, the specific motion candidate may be used to generate more than one motion block respectively included in different collocated frames.

In some implementations, since the number of the motion blocks generated based on the motion vector in the specific motion candidate may be greater than one, the decoder module 124 may determine a motion cost value for each of the motion blocks generated in different collocated frames based on the same motion vector. The motion cost value may be determined by a template matching cost function. The decoder module 124 may determine a motion region for each of the motion blocks generated based on the same motion vector and compare the motion regions with the template region of the block unit. Then, the decoder module 124 may compare the motion cost values of the motion blocks generated in different collocated frames based on the same motion vector with each other to select only one of the one or more collocated frame including one of the motion blocks for the motion vector of the specific motion candidate. Thus, the one of the motion blocks for the specific motion candidate may be set as a collocated block for further comparing with other collocated blocks of the other motion candidates. Therefore, the number of the collocated blocks may be equal to the number of the frame indices being equal to one of at least one predefined value.

In some implementations, the motion blocks generated in different collocated frames based on the same motion vector may not be compared with each other. The decoder module 124 may generate all of the motion blocks in the one or more collocated frames based on all of the motion candidates and set all of the motion blocks as the collocated blocks. Therefore, the number of the collocated blocks may be equal to a quantity generated by multiplying the number of the frame indices being equal to one of at least one predefined value with the number of the one or more collocated frame, since the number of the motion vectors for determining the collocated blocks may be equal to the number of the frame indices being equal to one of at least one predefined value.

Returning to FIG. 8, at block 860, the decoder module 124 derives multiple subblock-based temporal motion vector prediction (SbTMVP) candidates based on motion information of the multiple collocated blocks.

With reference to FIGS. 1 and 2, the decoder module 124 may determine whether the collocated blocks have motion information. When the collocated blocks are predicted or reconstructed by intra prediction, the collocated blocks may only include an intra-predictive mode without the motion information. When the collocated blocks are predicted or reconstructed by inter prediction, the decoder module 124 may receive the motion information of the collocated blocks.

The motion information for each of the collocated blocks may include vector information, list information, and frame information for a corresponding one of the collocated blocks. In addition, the vector information, the list information, and the frame information of a specific one of the collocated blocks may be used to predict the specific collocated block for reconstructing the specific collocated block.

The decoder module 124 may use the motion information of the collocated blocks to determine the SbTMVP candidates, each corresponding to one of the collocated blocks. In some implementations, the decoder module 124 may determine an initial SbTMVP list including all of the SbTMVP candidates for block unit. When the block unit is predicted based on the SbTMVP candidates, the block unit may be divided into multiple subblock units. Thus, each of the collocated blocks may also be divided into multiple collocated subblocks. The decoder module 124 may use the motion information of the collocated blocks to determine multiple first subblock vectors Vs1 for the collocated subblocks since the collocated frame is reconstructed prior to reconstruct the image frame. Then, the decoder module 124 may derive multiple second subblock vectors Vs2 for the subblock units based on the multiple first subblock vectors Vs1. For example, the decoder module 124 may use the motion information of a specific one of collocated blocks to determine M first subblock vectors Vs1 for M collocated subblocks in the specific collocated block. Then, the decoder module 124 may derive M second subblock vectors Vs2 for M subblock units in the block unit based on the M first subblock vectors Vs1. Each of the M second subblock vectors Vs2 may be derived based on a corresponding one of the M first subblock vectors Vs1, a reference distance between the image frame and a reference frame of the block unit, and a collocated distance between the collocated frame and a collocated reference frame of the collocated block.

Furthermore, when a specific one of the collocated subblocks is included in a uni-predictive block, the decoder module 124 may derive one second subblock vector for a specific one of the subblock unit corresponding the specific collocated subblock. In addition, when the specific collocated subblock is included in a bi-predictive block, the decoder module 124 may derive two second subblock vectors for the specific subblock unit corresponding the specific collocated subblock. In some implementations, some of the collocated subblocks in the specific collocated block may be uni-predictive blocks, and the others of the collocated subblocks in the specific collocated block may be bi-predictive blocks. Thus, when the decoder module 124 determines M collocated subblocks in the specific collocated block, the decoder module 124 may use the motion information of the M collocated subblocks to determine M+X first subblock vectors Vs1 for M collocated subblocks in the specific collocated block. Then, the decoder module 124 may derive M+X second subblock vectors Vs2 for M subblock units in the block unit based on the M+X first subblock vectors Vs1. The number X may be equal to the number of the bi-predictive collocated subblocks in the specific collocated block. The number X may be within a range of 0 to M. Therefore, the number of the second subblock vectors Vs2 may be within a range of M to 2M.

Since the M first subblock vectors Vs1 of the collocated subblocks may be received from difference coding units and difference from each other, the M second subblock vectors Vs2 of the subblock units may be different from each other. Thus, when the decoder module 124 uses the M second subblock vectors Vs2 determined from a specific one of the collocated blocks to determine one of the SbTMVP candidates, the decoder module 124 may determine multiple reference subblocks non-adjacent to each other since the M second subblock vectors Vs2 corresponding to the specific collocated block may be different from each other. In some implementations, each of the SbTMVP candidates may indicate the M first subblock vectors Vs1 for a corresponding one of the collocated blocks. In some implementations, each of the SbTMVP candidates may indicate the M second subblock vectors Vs2 corresponding to one of the collocated blocks for the block unit. In some implementations, each of the SbTMVP candidates may indicate the reference subblocks corresponding to one of the collocated blocks for the block unit.

Returning to FIG. 8, at block 870, the decoder module 124 determines multiple first cost values, each corresponding to one of the multiple SbTMVP candidates.

With reference to FIGS. 1 and 2, the decoder module 124 may determine the template region adjacent to the block unit from the image frame. The template region may include at least one of the multiple adjacent regions. A first adjacent region may be an adjacent region located above the block unit, a second adjacent region may be an adjacent region located on the left side of the block unit, and a third adjacent region may be an adjacent region located on the top-left side of the block unit. The adjacent regions may be reconstructed prior to reconstructing the block unit.

The decoder module 124 may further determine a reference region including multiple reference sub-regions generated for the reference subblocks corresponding to one of the collocated blocks. Since the reference subblocks corresponding to a specific one of the collocated blocks may be non-adjacent to each other, the reference sub-regions corresponding to the specific collocated block may be determined based on a part of the M second subblock vectors Vs2. The part of the M second subblock vectors Vs2 may belong to the subblock units located at a top boundary of the block unit or the subblock units located at a left boundary of the block unit.

Figures 9A, 9B:
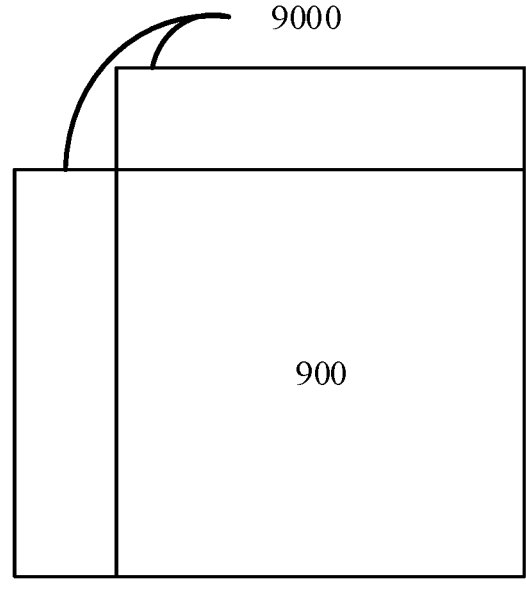
FIGS. 9A-9B are schematic illustrations of the template region and the reference region, in accordance with one or more example implementations of this disclosure.

FIGS. 9A and 9B are schematic illustrations of the template region and the reference region, in accordance with one or more example implementations of this disclosure. FIG. 9A is a schematic illustration of a block unit 900 and a template region 900, in accordance with one or more example implementations of this disclosure. The template region 9000 adjacent to the block unit is determined in the image frame. The template region 9000 may be reconstructed prior to reconstructing the block unit 900.

FIG. 9B is a schematic illustration of multiple reference subblocks 901-916 and a reference region, in accordance with one or more example implementations of this disclosure. The reference region may include multiple reference sub-regions 9011, 9051, 9091, 9131, 9132, 9142, 9152, and 9162. The reference sub-regions 9011, 9051, 9091, and 9131 may be respectively located on the left side of the reference subblocks 901, 905, 909, and 913. The reference sub-regions 9132, 9142, 9152, and 9162 may be respectively located above the reference subblocks 913-916. The reference subblocks 901, 905, 909, and 913 may be determined based on the subblock units located at the left boundary of the block unit 900 and the second subblock vectors Vs2 of the subblock units located at the left boundary. The reference subblocks 913-916 may be determined based on the subblock units located at the top boundary of the block unit 900 and the second subblock vectors Vs2 of the subblock units located at the top boundary.

The decoder module 124 may determine a reference cost value based on the template region and each of the multiple reference regions by using a cost function. The decoder module 124 may directly compare the reference regions, each corresponding to one of the collocated blocks, with the template region 9000 of the block unit 900 by the cost function. For examples, the decoder module 124 may compare the reconstructed samples in a specific one of the reference regions corresponding to a specific one of the collocated blocks with the reconstructed samples in the template region 9000 of the block unit 900 to generate one of the reference cost values.

The cost function may be a template matching cost function including, but not limited to, SAD, SAT), MAD, MSD, and SSIM. It should be noted that any cost function may be used without departing from the embodiments described in this disclosure.

In order to distinguish the reference cost values, the neighboring cost values, the averaged cost values, and the motion cost values from each other, the reference cost values may be regarded as the first cost values, the neighboring cost values may be regarded as multiple second cost values, the averaged cost values may be regarded as multiple third cost values, and the motion cost values may be regarded as multiple fourth cost values. Since the second cost values and the third cost values may be used for determining the motion candidates only in some implementations of the method 800, it may be unnecessary to use the second cost values and the third cost values in the method 800. Since the fourth cost values may be used for determining the collocated blocks in some implementations of the method 800, it may be unnecessary to use the fourth cost values in the method 800. In some implementations, all of the second cost values, the third cost values, and the fourth cost values may be used in method 800 for determining the motion candidates and determining the collocated blocks.

At block 880, the decoder module 124 determines an arrangement for the multiple SbTMVP candidates based on the first cost values and generates an adjusted SbTMVP list based on the arrangement.

With reference to FIGS. 1 and 2, the decoder module 124 may determine the arrangement of the SbTMVP candidates based on the first cost values and reorder the SbTMVP candidates based on the arrangement. In some implementations, the SbTMVP candidates may be reordered in an ascending order or a descending order of the first cost values.

Before the arrangement is determined based on the first cost values, the SbTMVP candidates may be ordered based on arbitrary rules. For example, the SbTMVP candidates may be ordered based on an order of the adjacent positions and the non-adjacent positions.

The SbTMVP candidates may be reordered in the ascending order of the reference cost values. Thus, when the reference cost value of a specific one of the SbTMVP candidates is less than the reference cost values of the other SbTMVP candidates, the specific SbTMVP candidate may be moved forward to be a first SbTMVP candidate based on the arrangement. In other words, the specific SbTMVP candidate may be moved to be the first SbTMVP candidate when the reference cost value of the specific SbTMVP candidate is the minimum of the reference cost values of the six SbTMVP candidates. In addition, the specific SbTMVP candidate may be moved to be a last one of the SbTMVP candidates when the reference cost value of the specific SbTMVP candidate is the maximum of the reference cost values of the SbTMVP candidates. For example, the SbTMVP candidates may include six SbTMVP candidates SC1, SC2, SC3, SC4, SC5 and SC6 having six reference cost values (CV1, CV2, CV3, CV4, CV5, and CV6) when the number of the SbTMVP candidate is equal to six. When a value order of the six reference cost values is CV4>CV2>CV5>CV1>CV6>CV3, the arrangement of the SbTMVP candidates may be changed from an original order of the six SbTMVP candidates SC1, SC2, SC3, SC4, SC5 and SC6 to a new order of the six SbTMVP candidates SC3, SC6, SC1, SC5, SC2, and SC4.

The arrangement may be further determined by adjusting the new order of the SbTMVP candidates based on a diversity criterion. The decoder module 124 may determine a difference value between two of the reference cost values selected from two neighboring ones of the SbTMVP candidates order in the new order. When the difference value is less than or equal to a diversity threshold, the last one of the two neighboring ones of the SbTMVP candidates may be moved backward. For example, the value order of the six reference cost values is CV4>CV2>CV5>CV1>CV6>CV3, and the difference between two of the reference cost values CV1 and CV6 is less than the diversity threshold. Thus, the SbTMVP candidate SC1 may be moved backward. Therefore, the arrangement of the SbTMVP candidates may be further changed from the new order of the six SbTMVP candidates SC3, SC6, SC1, SC5, SC2, and SC4 to a final order of the six SbTMVP candidates SC3, SC6, SC5, SC1, SC2, and SC4. In some implementations, the arrangement may not be determined by adjusting the new order of the SbTMVP candidates based on the diversity criterion, so the arrangement may be identical to the new order of the SbTMVP candidates.

The decoder module 124 may select K SbTMVP candidates having the least reference cost values from the SbTMVP candidates and add the selected SbTMVP candidates into the adjusted SbTMVP list. The number K, being a positive integer, may be equal to the number of the SbTMVP candidates in the adjusted SbTMVP list and less than the total quantity of the SbTMVP candidates. In other words, the decoder module 124 may select the first to the K-th SbTMVP candidates ordered based on the arrangement when the SbTMVP candidates are reordered in the ascending order of the reference cost values to generate the arrangement. In some implementations, the adjusted SbTMVP list may be different from the initial SbTMVP list when the order of the first cost values is different from an original order of the SbTMVP candidates in the initial SbTMVP list. In some implementations, the adjusted SbTMVP list may be different from the initial SbTMVP list when the number of the K selected SbTMVP candidates is different from the number of the SbTMVP candidates in the initial SbTMVP list. In some implementations, the adjusted SbTMVP list may be identical to the initial SbTMVP list when the order of the first cost values is identical to the original order of the SbTMVP candidates in the initial SbTMVP list and the number of the K selected SbTMVP candidates is equal to the number of the SbTMVP candidates in the initial SbTMVP list.

Each of the SbTMVP candidates in the adjusted SbTMVP list may have an SbTMVP index. Thus, the SbTMVP index for the adjusted SbTMVP list may be within an index range of 0 to K-1 since the number of the SbTMVP candidates in the adjusted SbTMVP list is equal to K.

The SbTMVP candidates may be able to be divided into several candidate groups based on multiple division criteria. For example, the SbTMVP candidates may be able to divide into several candidate groups based on a neighboring position type, a block size of the block unit, or at least one predefined number. When the SbTMVP candidates is divided based on the neighboring position type, the SbTMVP candidates generated based on the non-adjacent positions may be included in one of the candidate groups, the SbTMVP candidates generated based on the adjacent positions may be included in another of the candidate groups, and the SbTMVP candidates with zero subblock motion vectors may be included in the others of the candidate groups. For example, the number of the SbTMVP candidates may be equal to 10. There may be two SbTMVP candidates generated based on the adjacent positions, seven SbTMVP candidates generated based on the non-adjacent positions and one SbTMVP candidate with the zero subblock motion vectors. Thus, the SbTMVP candidates may be divided into three candidate groups including a first candidate group having two SbTMVP candidates, a second candidate group having seven SbTMVP candidates and a third candidate group having one SbTMVP candidate.

In addition, when the SbTMVP candidates is divided based on the block size of the block unit, the decoder module 124 may determine a group size of the candidate groups based on the block size of the block unit. For example, when the block size is 8×8, the group size may be equal to 3. When the block size is 16×16, the group size may be equal to 5. Thus, the decoder module 124 may determine the group size based on the block size from a look-up table. In addition, the group size of the candidate groups may be equal to each other. In some implementations, the block size may be a width of the block unit. In some implementations, the block size may be a height of the block unit. In some implementations, the block size may be a size value generated by multiplying the width of the block unit by the height of the block unit. In some implementations, the block size may be a size value generated by dividing the width of the block unit by the height of the block unit. In some implementations, the block size may be a size value generated by dividing the height of the block unit by the width of the block unit. In some implementations, the block size may be calculated based on the width of the block unit and/or the height of the block unit.

When the SbTMVP candidates is divided based on the at least one predefined number, the decoder module 124 may determine a group size of the candidate groups based on the at least one predefined number. When the group sizes of the candidate groups are equal to each other, the number of the at least one predefined number may be equal to one. When some of the group sizes of the candidate groups are different from each other, the number of the at least one predefined number may be greater than one. Thus, the decoder module 124 may divide the SbTMVP candidates into several candidate groups each having the same or different group sizes. In addition, the number of the at least one predefined number is equal to one, the group size of the last candidate group may be different from the groups size of the other candidate groups since the number of the SbTMVP candidate may not be divisible by the predefined number. In some implementations, the number of the SbTMVP candidates may be equal to five. The predefined number for dividing the SbTMVP candidates may be equal to three. The SbTMVP candidates in the first candidate group may be regarded as the candidates SbTMVP0, SbTMVP1, and SbTMVP2 each having a corresponding indices 0, 1 and, 2, and the SbTMVP candidates in the second candidate group may be regarded as the candidates SbTMVP3 and SbTMVP4 each having a corresponding indices 3 and 4.

In some implementations, the group sizes of the candidate groups may be different from each other. Thus, when the number of the candidate groups is equal to x, the group size may be equal to N1, N2, N3, . . . , and Nx. For example, the SbTMVP candidate may be divided into two candidate groups. The first candidate group may include the first N1 SbTMVP candidates having the indices from 0 to (N1−1), and the second candidate group may include N2 SbTMVP candidates having the indices from N1 to (N1+N2−1). In some implementations, the number of the SbTMVP candidates may be equal to 15. The predefined numbers for dividing the SbTMVP candidates may be equal to 4, 5, and 6. Therefore, the SbTMVP candidates may be divided into three candidate groups each having different group sizes. The first subgroup may include four SbTMVP candidates each having the indices from 0 to 3. The second subgroup may include five SbTMVP candidates each having the indices from 4 to 8. The third subgroup may include six SbTMVP candidates each having the indices from 9 to 14.

The SbTMVP candidates may be collected based on a collection index used for deriving how many SbTMVP candidates the decoder module 124 collects for selecting one of the SbTMVP candidates. For example, when the collection index indicates that the selected SbTMVP candidates is included in a p-th candidate groups, the number of the SbTMVP candidates collected by the decoder module 124 may be greater than the sum of N1, N2, . . . , and Np. In other words, the decoder module 124 may only collect P SbTMVP candidates, and the amount of the P SbTMVP candidates may be sufficient to distribute into the first p-th candidate groups. In some implementations, the collection index may be a candidate group index indicating which one of the candidate groups include the selected SbTMVP candidates. In some implementations, a prediction index directly indicating the selected SbTMVP candidate may be used as the collection index to derive the number of the collected SbTMVP candidates. For example, the number of the SbTMVP candidates may be equal to 15, and the predefined numbers for dividing the SbTMVP candidates may be equal to 4, 5, and 6. When the parsed prediction index is equal to five, the selected SbTMVP candidate may be included in the second candidate group. Thus, the decoder module 124 may stop to collect the SbTMVP candidates, when there are nine collected SbTMVP candidates.

In some implementations, the SbTMVP candidates in each of the candidate groups may be reordered in the ascending order of the reference cost values of the SbTMVP candidates in a corresponding one of the candidate groups. Thus, when the reference cost value of a specific one of the SbTMVP candidates included in a specific one of the candidate groups is less than the reference cost values of the other SbTMVP candidates in the specific candidate group, the specific SbTMVP candidate may be moved forward to be a first SbTMVP candidate in the specific candidate group based on the arrangement. In other words, the specific SbTMVP candidate may be moved to be a first SbTMVP candidate in the specific candidate group when the reference cost value of the specific SbTMVP candidate in the specific candidate group is the minimum of the reference cost values of the specific candidate group.

Returning to FIG. 8, at block 890, the decoder module 124 reconstructs the block unit based on the adjusted SbTMVP list.

With reference to FIGS. 1 and 2, the decoder module 124 may select, based on a prediction index, one of the SbTMVP candidates ordered based on the arrangement from the adjusted SbTMVP list. The prediction index may indicate a prediction candidate of the block unit from the SbTMVP candidates ordered based on the arrangement in the adjusted SbTMVP list. In some implementations, the prediction index may be an index SbTMVP_idx to determine the selected one of the SbTMVP candidates.

An index value of the SbTMVP index in the adjusted SbTMVP list may be within an index range of 0 to K-1. Therefore, the SbTMVP candidates arranged after a K-th of the SbTMVP candidates ordered by the arrangement may be excluded from selecting the prediction candidate since the index value of the SbTMVP index may not be greater than K-1.

In some implementations, the SbTMVP candidates ordered based on the arrangement in the adjusted SbTMVP list may be added into a candidate list. The decoder module 124 may select, based on a prediction index, one of multiple mode candidates including the SbTMVP candidates ordered based on the arrangement. The prediction index may indicate the prediction candidate of the block unit. For example, the candidate list may be a subblock merge list, and the prediction index may be a subblock merge index. In addition, the candidate list may be a merge list, and the prediction index may be a merge index.

The decoder module 124 may determine a selected one of the SbTMVP candidates based on an index in the bitstream, and then determine the prediction candidate based on the selected SbTMVP candidate. Then, the decoder module 124 may generate a predicted block of the block unit based on the selected SbTMVP candidate.

The decoder module 124 may further add multiple residual components into the prediction block to reconstruct the block unit. The residual components may be determined from the bitstream. The decoder module 124 may reconstruct all of the other block units in the image frame for reconstructing the image frame and the video data.

Another method M2 generated by combing the method 300 with the method 800 may be performed using the configurations illustrated in FIGS. 1 and 2, and various elements of these figures are referenced with regard to the method 300 and the method 800.

In the method M2, the decoder module 124 may decode the video data based on the blocks 310-360 in the method 300. Then, the decoder module 124 may select a portion of the collocated blocks based on the collocated cost values of the collocated blocks. For example, when the number of the portion of the collocated blocks is equal to Y, Y collocated blocks may be selected based on the Y lowest one of the collocated cost values to determine Y collocated candidate. The number Y may be a positive integer.

In the method M2, after the Y collocated blocks is selected, the decoder module 124 may decode the video data based on the blocks 860-890 in the method 800. Thus, the decoder module 124 may derive the SbTMVP candidate based on the motion information of the Y collocated blocks for reconstructing the block unit. The method/process 800 may then end.

Figure 10:
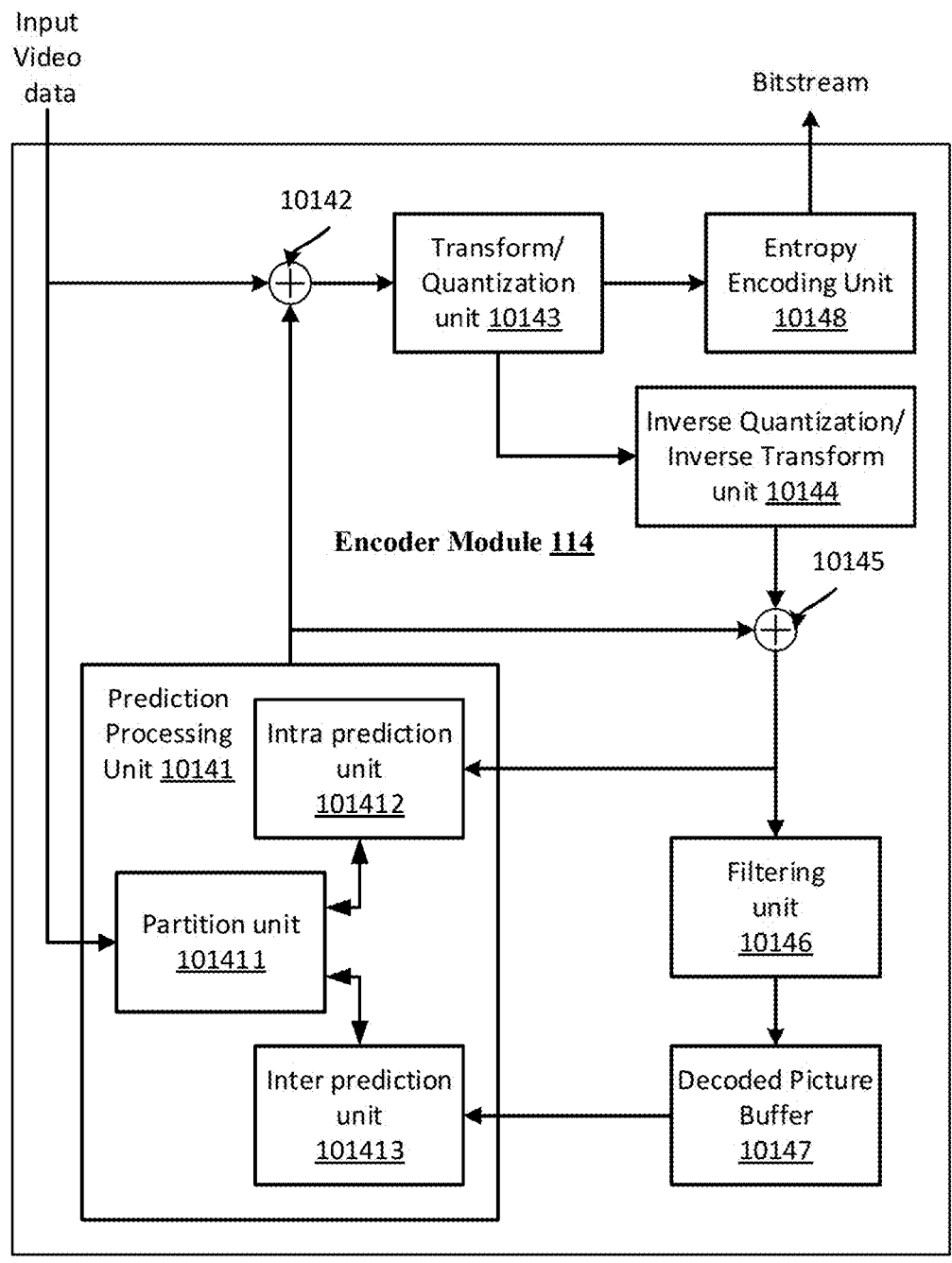
FIG. 10 is a block diagram illustrating the encoder module of the first electronic device illustrated in FIG. 1, in accordance with one or more example implementations of this disclosure.

FIG. 10 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 10141), at least a first summer (e.g., a first summer 10142) and a second summer (e.g., a second summer 10145), a transform/quantization processor (e.g., a transform/quantization unit 10143), an inverse quantization/inverse transform processor (e.g., an inverse quantization/inverse transform unit 10144), a filter (e.g., a filtering unit 10146), a decoded picture buffer (e.g., a decoded picture buffer 10147), and an entropy encoder (e.g., an entropy encoding unit 10148). The prediction processing unit 10141 of the encoder module 114 may further include a partition processor (e.g., a partition unit 101411), an intra prediction processor (e.g., an intra prediction unit 101412), and an inter prediction processor (e.g., an inter prediction unit 101413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 10141 may receive a current image block of a specific one of the image frames. The current image block may be the luminance block or one of the chrominance blocks in the specific image frame.

The partition unit 101411 may divide the current image block into multiple block units. The intra prediction unit 101412 may perform intra-predictive coding of a current block unit relative to one or more neighboring blocks in the same frame as the current block unit in order to provide spatial prediction. The inter prediction unit 101413 may perform inter-predictive coding of the current block unit relative to one or more blocks in one or more reference image blocks to provide temporal prediction.

The prediction processing unit 10141 may select one of the coding results generated by the intra prediction unit 101412 and the inter prediction unit 101413 based on a mode selection method, such as a cost function. The mode selection method may be a rate-distortion optimization (RDO) process.

The prediction processing unit 10141 may determine the selected coding result and provide a predicted block corresponding to the selected coding result to the first summer 10142 for generating a residual block and to the second summer 10145 for reconstructing the encoded block unit. The prediction processing unit 10141 may further provide syntax elements, such as motion vectors, intra-mode indicators, partition information, and/or other syntax information, to the entropy encoding unit 10148.

The intra prediction unit 101412 may intra-predict the current block unit. The intra prediction unit 101412 may determine an intra prediction mode directed toward a reconstructed sample neighboring the current block unit in order to encode the current block unit.

The intra prediction unit 101412 may encode the current block unit using various intra prediction modes. The intra prediction unit 101412 of the prediction processing unit 10141 may select an appropriate intra prediction mode from the selected modes. The intra prediction unit 101412 may encode the current block unit using a cross-component prediction mode to predict one of the two chroma components of the current block unit based on the luma components of the current block unit. The intra prediction unit 101412 may predict a first one of the two chroma components of the current block unit based on the second of the two chroma components of the current block unit.

The inter prediction unit 101413 may inter-predict the current block unit as an alternative to the intra prediction performed by the intra prediction unit 101412. The inter prediction unit 101413 may perform motion estimation to estimate motion of the current block unit for generating a motion vector.

The motion vector may indicate a displacement of the current block unit within the current image block relative to a reference block unit within a reference image block. The inter prediction unit 101413 may receive at least one reference image block stored in the decoded picture buffer 10147 and estimate the motion based on the received reference image blocks to generate the motion vector.

The first summer 10142 may generate the residual block by subtracting the prediction block determined by the prediction processing unit 10141 from the original current block unit. The first summer 10142 may represent the component or components that perform this subtraction.

The transform/quantization unit 10143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 10143 may perform a scan of the matrix including the quantized transform coefficients. Alternatively, the entropy encoding unit 10148 may perform the scan.

The entropy encoding unit 10148 may receive multiple syntax elements from the prediction processing unit 10141 and the transform/quantization unit 10143, including a quantization parameter, transform data, motion vectors, intra modes, partition information, and/or other syntax information. The entropy encoding unit 10148 may encode the syntax elements into the bitstream.

The entropy encoding unit 10148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 10144 may apply inverse quantization and inverse transformation to reconstruct the residual block in the pixel domain for later use as a reference block. The second summer 10145 may add the reconstructed residual block to the prediction block provided by the prediction processing unit 10141 in order to produce a reconstructed block for storage in the decoded picture buffer 10147.

The filtering unit 10146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 10145.

The decoded picture buffer 10147 may be a reference picture memory that stores the reference block to be used by the encoder module 114 to encode video, such as in intra-coding or inter-coding modes. The decoded picture buffer 10147 may include a variety of memory devices, such as DRAM (e.g., including SDRAM), MRAM, RRAM, or other types of memory devices. The decoded picture buffer 10147 may be on-chip with other components of the encoder module 114 or off-chip relative to those components.

The method/process 300 for decoding and/or encoding video data may be performed by the first electronic device 110. With reference to FIGS. 1, 3, and 8, at block 310, the method/process 300 may start by the encoder module 114 receiving the video data. The video data received by the encoder module 114 may be a video. At block 320, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks according to the partition indications based on any video coding standard.

With reference to FIGS. 1, 3, and 10, the encoder module 114 may determine multiple candidate positions including at least one non-adjacent position which is non-adjacent to the block unit. The candidate positions may be multiple neighboring positions neighboring the block unit. The neighboring positions may be selected from at least one of multiple adjacent positions adjacent to the block unit or multiple non-adjacent positions non-adjacent to the block unit.

With reference to FIGS. 1, 3, and 10, the encoder module 114 may determine multiple motion candidates from the multiple candidate positions. The encoder module 114 may determine multiple neighboring blocks neighboring the block unit based on the candidate positions. Each of the neighboring blocks may cover at least one of the candidate positions. The encoder module 114 may determine a template region adjacent to the block unit from the image frame and determine multiple neighboring regions from the image frame. Each of the neighboring regions may be adjacent to a corresponding one of the neighboring blocks. The encoder module 114 may determine a neighboring cost value based on the template region and each of the multiple neighboring regions by using a cost function to select the motion candidates for the block unit. The encoder module 114 may select multiple candidate blocks based on the neighboring cost values calculated by the neighboring regions. The candidate blocks may be a reconstructed block reconstructed prior to reconstructing the block unit. When one of the candidate blocks does not have motion information, the motion candidate may not be determined based on a corresponding one the selected neighboring positions. In addition, the motion candidate may further include a history-based candidate determined from a first-in-first-out (FIFO) table storing multiple previous motion information of multiple previous blocks reconstructed prior to reconstructing the block unit.

With reference to FIGS. 1, 3, and 10, the encoder module 114 may select, based on the multiple motion candidates, multiple collocated blocks each included in one of one or more collocated frame. Each of the multiple motion candidates may indicate a motion vector, list information, and frame information of a candidate block covering one of the multiple candidate positions. The encoder module 114 may determine the one or more collocated frame based on at least one predefined value. When one of multiple frame indices in the frame information of a specific one of the candidate blocks is equal to one of the at least one predefined value, a reference frame of the specific candidate block selected from a corresponding one of reference lists indicated by the list information of the specific candidate block may be included in the one or more collocated frame. The encoder module 114 may use a specific one of the motion candidates corresponding to the specific candidate block to determine a motion block when the reference frame selected by the frame information in the specific motion candidate is included in the one or more collocated frame. Each of the motion blocks may be regarded as a collocated block. In some implementations, the encoder module 114 may determine a motion cost value for each of the motion blocks generated in different collocated frames based on the same motion vector. Then, the encoder module 114 may compare the motion cost values of the motion blocks to select the collocated blocks.

With reference to FIGS. 1, 3, and 10, the encoder module 114 may determine a collocated cost value for each of the multiple collocated blocks units. The encoder module 114 may determine, from the one or more collocated frame, multiple collocated regions each adjacent to one of the multiple collocated blocks. Each of the collocated regions may include at least one of multiple adjacent regions of a corresponding one of the collocated blocks. The encoder module 114 may determine the collocated cost value based on the template region and each of the multiple collocated regions by using a cost function.

With reference to FIGS. 1, 3, and 10, the encoder module 114 determines at least one subblock-based temporal motion vector prediction (SbTMVP) candidate based on the multiple motion candidates and the multiple first cost values. The encoder module 114 may select at least one of the collocated blocks based on the first cost values calculated by the collocated regions. Each of the at least one SbTMVP candidate may be determined based on a corresponding one of the at least one collocated candidates.

With reference to FIGS. 1, 3, and 10, the encoder module 114 may select one of multiple mode candidates in the candidate list including the at least one SbTMVP candidate based on a mode selection method, such as a cost function, for predicting the block unit. The encoder module 114 may predict the block unit based on the at least one SbTMVP candidate in the candidate list to generate multiple predicted blocks. Then, the encoder module 114 may further compare multiple the predicted samples included in each of the predicted blocks with multiple color components in the block unit. Thus, the encoder module 114 may determine a block cost value for each of the predicted blocks and select a prediction candidate of the block unit based on the block cost value from the mode candidates in the candidate list. The mode selection method may be a rate-distortion optimization (RDO) process. Then, the encoder module 114 may determine multiple residual components by comparing the color components in the block unit with the predicted samples generated based on the prediction mode. In addition, the residual components and a prediction index may be encoded into a bitstream for a decoder device to reconstruct the video data. The prediction index may indicate the selected one of the mode candidates in the candidate list. In some implementations, the prediction index may be an index SbTMVP_idx to determine a selected one of the SbTMVP candidates when the candidate list only includes the SbTMVP candidates.

With reference to FIGS. 1, 3, and 10, the encoder module 114 may further reconstruct the block unit based on the prediction candidate in the candidate list to generate a reconstructed block including multiple reconstructed samples. The reconstructed samples of the block unit may be used as references for predicting multiple following blocks in the video data.

Therefore, the encoder module 114 may also use the method 300 to predict and reconstruct the block unit for encoding the video data into the bitstream. Since the encoder module 114 and the decoder module 124 may use the same method 300, the encoder module 114 and the decoder module 124 may generate the same reordered list for decreasing the number of bits in the bitstream.

The method M1 similar to the method 300 for decoding/encoding video data may be performed by the first electronic device 110. In the method M1, the encoder module 114 may encode the video data based on the method 300. In addition, at block 370, after selecting at least one of the collocated blocks, the encoder module 114 further determine multiple shift blocks each neighboring one of the selected at least one collocated block. In some implementations, each of the shift blocks may be selected based on multiple neighboring positions including multiple adjacent positions and multiple non-adjacent positions as shown in FIG. 4.

With reference to FIGS. 1, 3, and 10, the encoder module 114 may determine a shift cost value based on the template region and each of the multiple collocated regions by using a cost function. In FIG. 7, the encoder module 114 may directly compare each of the collocated regions 7700-7740 with the template region 7000 of the block unit 700 by the cost function. When one of the shift cost values determined based on the collocated regions of the shift block is less than the shift cost value determined based on the collocated region of the collocated block, the corresponding one of the shift blocks may replace the collocated block for determining the collocated candidate.

The method/process 800 for decoding and/or encoding video data may be performed by the first electronic device 110. With reference to FIGS. 1, 8, and 10, the method/process 300 may start by the encoder module 114 receiving the video data. The video data received by the encoder module 114 may be a video. The encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks according to the partition indications based on any video coding standard.

With reference to FIGS. 1, 8, and 10, the encoder module 114 may determines multiple candidate positions selected from multiple adjacent positions adjacent to the block unit and multiple non-adjacent positions non-adjacent to the block unit. The candidate positions may be multiple neighboring positions neighboring the block unit. The neighboring positions may be selected from at least one of multiple adjacent positions adjacent to the block unit or multiple non-adjacent positions non-adjacent to the block unit.

With reference to FIGS. 1, 8, and 10, the encoder module 114 may determine multiple motion candidates from the multiple candidate positions. The encoder module 114 may determine multiple neighboring blocks neighboring the block unit based on the candidate positions. Each of the neighboring blocks may cover at least one of the candidate positions. The encoder module 114 may determine a template region adjacent to the block unit from the image frame and determine multiple neighboring regions from the image frame. Each of the neighboring regions may be adjacent to a corresponding one of the neighboring blocks. The encoder module 114 may determine a neighboring cost value based on the template region and each of the multiple neighboring regions by using a cost function to select the motion candidates for the block unit. The encoder module 114 may select multiple candidate blocks based on the neighboring cost values calculated by the neighboring regions. The candidate blocks may be a reconstructed block reconstructed prior to reconstructing the block unit. When one of the candidate blocks does not have motion information, the motion candidate may not be determined based on a corresponding one the selected neighboring positions. In addition, the motion candidate may further include a history-based candidate determined from a first-in-first-out (FIFO)

table storing multiple previous motion information of multiple previous blocks reconstructed prior to reconstructing the block unit.

With reference to FIGS. 1, 8, and 10, the encoder module 114 may determine, based on the multiple motion candidates, multiple collocated blocks each included in one of one or more collocated frame. Each of the multiple motion candidates may indicate a motion vector, list information, and frame information of a candidate block covering one of the multiple candidate positions. The encoder module 114 may determine the one or more collocated frame based on at least one predefined value. When one of multiple frame indices in the frame information of a specific one of the candidate blocks is equal to one of the at least one predefined value, a reference frame of the specific candidate block selected from a corresponding one of reference lists indicated by the list information of the specific candidate block may be included in the one or more collocated frame. The encoder module 114 may use a specific one of the motion candidates corresponding to the specific candidate block to determine a motion block when the reference frame selected by the frame information in the specific motion candidate is included in the one or more collocated frame. Each of the motion blocks may be regarded as a collocated block. In some implementations, the encoder module 114 may determine a motion cost value for each of the motion blocks generated in different collocated frames based on the same motion vector. Then, the encoder module 114 may compare the motion cost values of the motion blocks to select the collocated blocks.

With reference to FIGS. 1, 8, and 10, the encoder module 114 may derive multiple subblock-based temporal motion vector prediction (SbTMVP) candidates based on motion information of the multiple collocated blocks. The encoder module 114 may determine whether the collocated blocks have motion information. The encoder module 114 may use the motion information of the collocated blocks to determine the SbTMVP candidates, each corresponding to one of the collocated blocks. When the block unit is predicted based on the SbTMVP candidates, the block unit may be divided into multiple subblock units. Thus, each of the collocated blocks may also be divided into multiple collocated subblocks. The encoder module 114 may use the motion information of the collocated blocks to determine multiple first subblock vectors Vs1 for the collocated subblocks since the collocated frame is reconstructed prior to reconstruct the image frame. Then, the encoder module 114 may derive multiple second subblock vectors Vs2 for the subblock units based on the multiple first subblock vectors Vs1. Furthermore, when a specific one of the collocated subblocks is included in a uni-predictive block, the encoder module 114 may derive one second subblock vector for a specific one of the subblock unit corresponding the specific collocated subblock. In addition, when the specific collocated subblock is included in a bi-predictive block, the encoder module 114 may derive two second subblock vectors for the specific subblock unit corresponding the specific collocated subblock.

With reference to FIGS. 1, 8, and 10, the encoder module 114 may determine a reference cost value based on each of the multiple SbTMVP candidates. The encoder module 114 may determine a reference region including multiple reference sub-regions each generated for the reference subblocks corresponding to one of the collocated blocks. Since the reference subblocks corresponding a specific one of the collocated blocks may be non-adjacent to each other, the reference sub-regions corresponding to the specific collocated block may be determined based on a part of the M second subblock vectors Vs2. The part of the M second subblock vectors Vs2 may belong to the subblock units located at a top boundary of the block unit or the subblock units located at a left boundary of the block unit. The encoder module 114 may determine a reference cost value based on the template region and each of the multiple reference regions by using a cost function.

With reference to FIGS. 1, 8, and 10, the encoder module 114 determines an arrangement for the multiple SbTMVP candidates based on the first cost values and generates an adjusted SbTMVP list based on the arrangement. The encoder module 114 may determine the arrangement of the SbTMVP candidates based on the reference cost values and reorder the SbTMVP candidates based on the arrangement. The arrangement may be further determined by adjusting the new order of the SbTMVP candidates based on a diversity criterion. In some implementations, the SbTMVP candidates may be able to divide into several candidate groups based on multiple division criteria. For example, the SbTMVP candidates may be able to divide into several candidate groups based on a neighboring position type, a block size of the block unit, or at least one predefined number. In addition, the encoder module 114 may only collect P SbTMVP candidates, and the amount of the P SbTMVP candidates may be sufficient to distribute into the first p-th candidate groups.

With reference to FIGS. 1, 8, and 10, the encoder module 114 may select one of multiple mode candidates in the candidate list including the at least one SbTMVP candidate based on a mode selection method, such as a cost function, for predicting the block unit. The encoder module 114 may predict the block unit based on the at least one SbTMVP candidate in the candidate list to generate multiple predicted blocks. Then, the encoder module 114 may further compare multiple the predicted samples included in each of the predicted blocks with multiple color components in the block unit. Thus, the encoder module 114 may determine a block cost value for each of the predicted blocks and select a prediction candidate of the block unit based on the block cost value from the mode candidates in the candidate list. The mode selection method may be a rate-distortion optimization (RDO) process. Then, the encoder module 114 may determine multiple residual components by comparing the color components in the block unit with the predicted samples generated based on the prediction mode. In addition, the residual components and a prediction index may be encoded into a bitstream for a decoder device to reconstruct the video data. The prediction index may indicate the selected one of the mode candidates in the candidate list. In some implementations, the prediction index may be an index SbTMVP_idx to determine a selected one of the SbTMVP candidates when the candidate list only includes the SbTMVP candidates.

With reference to FIGS. 1, 8, and 10, the encoder module 114 may further reconstruct the block unit based on the prediction candidate in the candidate list to generate a reconstructed block including multiple reconstructed samples. The reconstructed samples of the block unit may be used as references for predicting multiple following blocks in the video data.

Therefore, the encoder module 114 may also use the method 800 to predict and reconstruct the block unit for encoding the video data into the bitstream. Since the encoder module 114 and the decoder module 124 may use the same method 800, the encoder module 114 and the decoder module 124 may generate the same reordered list for decreasing the number of bits in the bitstream.

The method M2 generated by combing the method 300 with the method 800 for decoding/encoding video data may be performed by the first electronic device 110. In the method M2, the encoder module 114 may encode the video data based on the blocks 310-360 in the method 300. Then, the encoder module 114 may select a portion of the collocated blocks based on the collocated cost values of the collocated blocks. After the portion of the collocated blocks is selected, the encoder module 114 may encode the video data based on the blocks 860-890 in the method 800. Thus, the encoder module 114 may derive the SbTMVP candidate based on the motion information of the portion of the collocated blocks for reconstructing the block unit.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data performed by an electronic device, the method comprising:

receiving the video data;

determining a block unit from an image frame that is included in the video data;

determining a plurality of candidate positions, including at least one non-adjacent position which is non-adjacent to the block unit;

determining, from the image frame, a plurality of neighboring blocks, neighboring the block unit, based on the plurality of candidate positions, wherein at least one of the plurality of neighboring blocks covers one of the at least one non-adjacent position;

determining, from the image frame, a template region that is adjacent to the block unit, and a plurality of neighboring regions, each adjacent to one of the plurality of neighboring blocks;

determining a plurality of first cost values, each corresponding to the template region and one of the plurality of neighboring regions;

selecting a plurality of candidate blocks based on the plurality of first cost values;

determining a plurality of motion candidates from the plurality of candidate blocks;

selecting, based on the plurality of motion candidates, a plurality of collocated blocks, each included in one of one or more collocated frames that are included in the video data;

determining a plurality of second cost values, each corresponding to one of the plurality of collocated blocks;

determining at least one subblock-based temporal motion vector prediction (SbTMVP) candidate based on the plurality of motion candidates and the plurality of first second cost values; and reconstructing the block unit based on the at least one SbTMVP candidate.

2. The method according to claim 1, wherein the plurality of candidate positions further includes at least one of a plurality of adjacent positions, adjacent to the block unit.

3. The method according to claim 1, wherein:

each of the plurality of motion candidates indicates a motion vector, list information, and frame information of a candidate block that covers one of the plurality of candidate positions, and a reference frame of a specific candidate block in the plurality of candidate blocks selected from a reference list, that is indicated by the list information of the specific candidate block, is included in the one or more collocated frames when a frame index in the frame information of the specific candidate block is equal to one of at least one predefined value.

4. The method according to claim 3, wherein one of the plurality of collocated blocks is selected from the reference frame of the specific candidate block based on the motion vector and a corresponding one of the plurality of candidate positions.

5. The method according to claim 3, wherein the reference frame of the specific candidate block is excluded from the one or more collocated frames when the frame index in the frame information of the specific candidate block is different from the at least one predefined value.

6. The method according to claim 1, wherein:

each of the plurality of motion candidates indicates a motion vector, list information, and frame information of a candidate block that covers one of the plurality of candidate positions, at least one reference frame of a specific candidate block in the plurality of candidate blocks is determined from two reference lists of the specific candidate block when the specific candidate block is a bi-prediction block, and the at least one reference frame is included in the one or more collocated frames when one of two frame indices in the frame information of the specific candidate block is equal to one of at least one predefined value.

7. The method according to claim 1, wherein reconstructing the block unit based on the at least one SbTMVP candidate comprises:

adding the at least one SbTMVP candidate into a candidate list;

selecting a prediction candidate from the candidate list based on a prediction index; and reconstructing the block unit based on the selected prediction candidate.

8. The method according to claim 1, wherein the plurality of collocated blocks is selected from more than one collocated frame.

9. The method according to claim 1, further comprising:

determining, from the one or more collocated frames, a plurality of collocated regions, each adjacent to one of the plurality of collocated blocks; and determining the plurality of second cost values between the template region and each of the plurality of collocated regions.

10. An electronic device for decoding video data, the electronic device comprising:

at least one processor; and at least one non-transitory computer-readable medium coupled to the at least one processor and storing one or more computer-executable instructions that, when executed by the at least one processor, cause the electronic device to:

receive the video data;

determine a block unit from an image frame that is included in the video data;

determine a plurality of candidate positions, including at least one non-adjacent position which is non-adjacent to the block unit;

determine, from the image frame, a plurality of neighboring blocks, neighboring the block unit, based on the plurality of candidate positions, wherein at least one of the plurality of neighboring blocks covers one of the at least one non-adjacent position;

determine, from the image frame, a template region that is adjacent to the block unit, and a plurality of neighboring regions, each adjacent to one of the plurality of neighboring blocks;

determine a plurality of first cost values, each corresponding to the template region and one of the plurality of neighboring regions;

select a plurality of candidate blocks based on the plurality of first cost values;

determine a plurality of motion candidates from the plurality of candidate blocks;

select, based on the plurality of motion candidates, a plurality of collocated blocks, each included in one of one or more collocated frames that are included in the video data;

determine a plurality of second cost values, each corresponding to one of the plurality of collocated blocks;

determine at least one subblock-based temporal motion vector prediction (SbTMVP) candidate based on the plurality of motion candidates and the plurality of second cost values; and reconstruct the block unit based on the at least one SbTMVP candidate.

11. The electronic device according to claim 10, wherein the plurality of candidate positions further includes at least one of a plurality of adjacent positions, adjacent to the block unit.

12. The electronic device according to claim 10, wherein:

each of the plurality of motion candidates indicates a motion vector, list information, and frame information of a candidate block that covers one of the plurality of candidate positions, and a reference frame of a specific candidate block in the plurality of candidate blocks selected from a reference list, that is indicated by the list information of the specific candidate block, is included in the one or more collocated frames when a frame index in the frame information of the specific candidate block is equal to one of at least one predefined value.

13. The electronic device according to claim 12, wherein one of the plurality of collocated blocks is selected from the reference frame of the specific candidate block based on the motion vector and a corresponding one of the plurality of candidate positions.

14. The electronic device according to claim 12, wherein the reference frame of the specific candidate block is excluded from the one or more collocated frames when the frame index in the frame information of the specific candidate block is different from the at least one predefined value.

15. The electronic device according to claim 10, wherein:

each of the plurality of motion candidates indicates a motion vector, list information, and frame information of a candidate block that covers one of the plurality of candidate positions, at least one reference frame of a specific candidate block in the plurality of candidate blocks is determined from two reference lists of the specific candidate block when the specific candidate block is a bi-prediction block, and the at least one reference frame is included in the one or more collocated frames when one of two frame indices in the frame information of the specific candidate block is equal to one of at least one predefined value.

16. The electronic device according to claim 10, wherein reconstructing the block unit based on the at least one SbTMVP candidate comprises:

adding the at least one SbTMVP candidate into a candidate list;

selecting a prediction candidate from the candidate list based on a prediction index; and reconstructing the block unit based on the selected prediction candidate.

17. The electronic device according to claim 10, wherein the plurality of collocated blocks is selected from more than one collocated frame.

18. The electronic device according to claim 10, wherein the one or more computer-executable instructions, when executed by the at least one processor, further cause the electronic device to:

determine, from the one or more collocated frames, a plurality of collocated regions, each adjacent to one of the plurality of collocated blocks; and determine the plurality of second cost values between the template region and each of the plurality of collocated regions.

* * * * *